(12) United States Patent
Kida et al.

(10) Patent No.: US 8,964,200 B2
(45) Date of Patent: Feb. 24, 2015

(54) COMMUNICATION TERMINAL DEVICE, INFORMATION PROCESSOR TRANSMITTING TRANSMISSION TARGET DATA VIA A SERVER AND THE INFORMATION PROCESSOR TO A PREDEFINED FACSIMILE DEVICE

(71) Applicant: KYOCERA Document Solutions Inc., Osaka (JP)

(72) Inventors: Yasuhiko Kida, Osaka (JP); Yusuke Nakagoshi, Osaka (JP); Yasuhiro Fukui, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 0 days.

(21) Appl. No.: 14/091,870

(22) Filed: Nov. 27, 2013

(65) Prior Publication Data

US 2014/0153019 A1 Jun. 5, 2014

(30) Foreign Application Priority Data

Nov. 30, 2012 (JP) ................. 2012-263379

(51) Int. Cl.
*G06F 3/12* (2006.01)
*G06F 3/00* (2006.01)
*H04N 1/00* (2006.01)

(52) U.S. Cl.
CPC ............ *G06F 3/002* (2013.01); *H04N 1/00209* (2013.01); *H04N 2201/0075* (2013.01); *H04N 2201/3209* (2013.01)
USPC .......... 358/1.13; 358/407; 358/440; 358/438; 358/1.16; 358/1.15

(58) Field of Classification Search
CPC ............................ G06F 3/002; H04N 1/00962
USPC ........ 358/1.16, 1.6, 1.15, 1.1, 1.13, 407, 440, 358/438
See application file for complete search history.

(56) References Cited

U.S. PATENT DOCUMENTS

2010/0067063 A1* 3/2010 Jang .............................. 358/402
2012/0044533 A1* 2/2012 Inoue ........................... 358/1.15

FOREIGN PATENT DOCUMENTS

JP 2012-095138 5/2012

* cited by examiner

*Primary Examiner* — Martin Mushambo
(74) *Attorney, Agent, or Firm* — Knobbe Martens Olson & Bear LLP

(57) ABSTRACT

A communication terminal device includes a transmission target setting part; a transmission destination reception part, and a transmission part. The transmission target setting part sets, based on an instruction from an operator, specification of transmission target data targeted for fax transmission performed by a previously specified facsimile device. The transmission destination reception part receives, from the operator, input of transmission destination information indicating a destination for transmission of the transmission target data whose specification has been received by the transmission target setting part. The transmission part transmits the transmission target data and the transmission destination information to a server, together with a delivery instruction for delivering the transmission target data and the transmission destination information by the server where the predefined facsimile device is defined as a reception destination of the transmission target data and the transmission destination information.

6 Claims, 20 Drawing Sheets

COMMUNICATION TERMINAL DEVICE, INFORMATION PROCESSOR TRANSMITTING TRANSMISSION TARGET DATA VIA A SERVER AND THE INFORMATION PROCESSOR TO A PREDEFINED FACSIMILE DEVICE

INCORPORATION BY REFERENCE

This application claims priority to Japanese Patent Application No. 2012-263379 filed on 30 Nov. 2012, the entire contents of which are incorporated by reference herein.

BACKGROUND

This disclosure relates to a communication terminal device, an information processor, and a facsimile device, and more specifically to a data transmission technology for fax transmission.

Suggested as one example of the facsimile device is a compound machine including: a copying function, a printer function, a scanner function, and further a fax transmission function. This compound machine includes a function of performing fax transmission of image data, acquired through document reading by a document reading unit, as transmission target data towards a transmission destination through a public telephone line by a facsimile communication part.

SUMMARY

As one aspect of this disclosure, a technology obtained by further improving the aforementioned technology is suggested.

A communication terminal device according to one aspect of this disclosure includes: a transmission target setting part, a transmission destination reception part, and a transmission part.

The transmission target setting part sets, based on an instruction from an operator, specification of transmission target data targeted for fax transmission performed by a predefined facsimile device.

The transmission destination reception part receives, from the operator, input of transmission destination information indicating a destination for transmission of the transmission target data whose specification is received by the transmission target setting part.

The transmission part transmits the transmission target data and the transmission destination information to a server, together with a delivery instruction for causing the server to deliver the transmission target data and the transmission destination information to the predefined facsimile device as a delivering destination.

An information processor according to another aspect of this disclosure includes: a data acquisition part, a conversion part, and a data transmission part.

The data acquisition part acquires, from a communication terminal device via a server, transmission target data targeted for fax transmission performed in a predefined facsimile device and transmission destination information thereof.

The conversion part converts the transmission target data acquired by the data acquisition part into data in a format applied in the facsimile device.

The data transmission part transmits, to the predefined facsimile device, the transmission target data already subjected to the conversion into the data in the format by the conversion part and the acquired transmission destination information.

A facsimile device according to still another aspect of this disclosure includes: an information reception part, a data conversion part, and a facsimile communication part.

The information reception part receives: from a network-connected communication terminal device via an information processor, transmission target data being targeted for fax transmission performed by the facsimile device and being converted into data in a format applied in the facsimile device; and transmission destination information indicating a transmission destination of the transmission target data.

The data conversion part converts the transmission target data received by the information reception part into data in a data format permitting fax transmission.

The facsimile communication part performs fax transmission of the transmission target data, subjected to the conversion by the conversion part, to a transmission destination indicated by the transmission destination information received by the information reception part.

DETAILED DESCRIPTION

Figure 1:
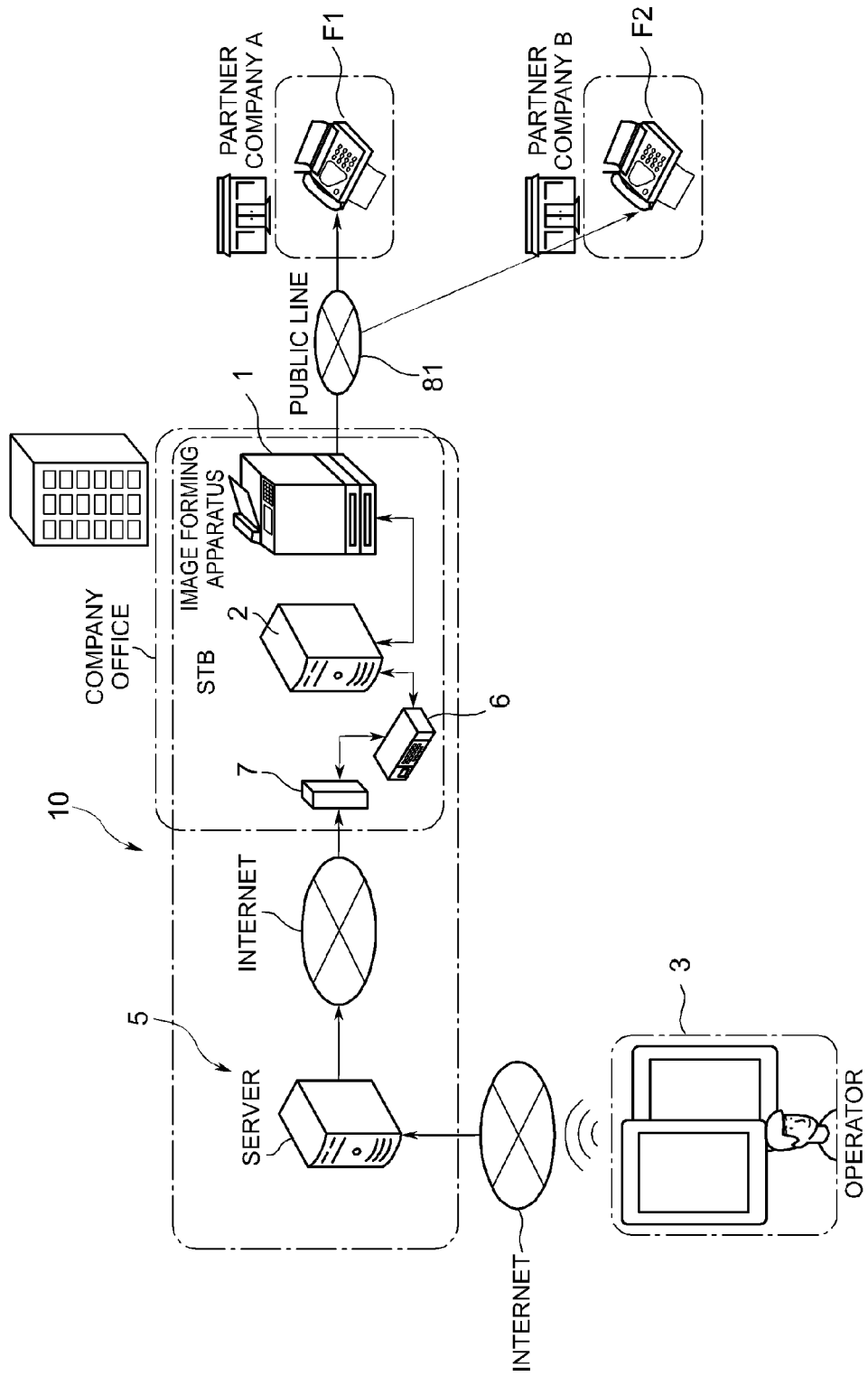
FIG. 1 is a diagram showing a fax communication system according to one embodiment of this disclosure.

With reference to the drawings, a communication terminal device, an information processor, and a facsimile device according to one embodiment of this disclosure will be described. FIG. 1 is a diagram showing the fax communication system according to one embodiment of this disclosure.

The fax communication system 10 according to one embodiment of this disclosure includes: an image forming apparatus 1, an information processor 2, and a communication terminal device 3. This image forming apparatus 1 is one example of the facsimile device.

The communication terminal device 3 is, for example, a tablet terminal, a smartphone, or a computer. The communication terminal device 3 has an Internet communication function, and is so configured as to be capable of data transmission and reception to and from a server 5. Moreover, the communication terminal device 3 may have a control unit 300 (FIG. 2) portion serving as a component of the fax communication system 10.

An operator operates the communication terminal device 3 to create, through, for example, an application installed in the communication terminal device 3, document data of a cover sheet and a document targeted for fax transmission performed by the image forming apparatus 1 with, for example, a fax number of a transmission destination (transmission destination information) written at a predefined position of the cover sheet. After creating this document data, the operator operates the communication terminal device 3 to cause the communication terminal device 3 to transmit, to the server 5, this document data as transmission target data subjected to fax transmission performed by the image forming apparatus 1. A method of transmitting the transmission target data to the server 5 is not limited, but in this embodiment, it is an e-mail format achieved by a mailer function of the communication terminal device 3. The communication terminal device 3 specifies a mail address corresponding to the image forming apparatus 1, which performs the fax transmission, and transmits the transmission target data in the e-mail format to the server 5 as a mail server.

The server 5 has configuration that enables communication between the communication terminal device 3 and the information processor 2. Specifically, the server 5 enables data transmission and reception between the communication terminal device 3 and the information processor 2 via the Internet. In this embodiment, upon reception of the transmission target data accompanied by the aforementioned mail address in the mail format from the communication terminal device 3, the server 5 saves this transmission target data in a storage region such as a built-in HDD.

The image forming apparatus 1 and the information processor 2 are installed in work environment such as an office, a company, or the like.

The information processor 2 is connected to the image forming apparatus 1 by a network such as a LAN in a manner such as to be communicable with the image forming apparatus 1, and is also connected to the server 5 on the Internet via a rooter 6 in a manner such as to be communicable with the server 5. Between the aforementioned work environment where the image forming apparatus 1, the information processor 2, and the rooter 6 are installed and external environment connected via the Internet, a firewall 7 is installed.

The information processor 2 accesses the server 5 to acquire the aforementioned mail address and transmission target data. In this embodiment, the information processor 2 accesses the server 5 by the included mailer every predefined given period, judges whether or not the transmission target data having the specific mail address preset for the image forming apparatus 1 is stored in a storage part of the server 5 in a mail format, and if the transmission target data having this mail address is stored in this storage part, acquires this transmission target data in the mail format.

The information processor 2 further analyzes the acquired transmission target data, and extracts a fax number as transmission destination information included in this transmission target data. For example, the information processor 2 extracts a fax number as transmission destination information included in document data as a cover sheet serving as transmission target data. Further, the information processor 2 converts this acquired transmission target data into data in a print data format (for example, a printer language such as PDL) applied in the image forming apparatus 1. The information processor 2 transmits, to the image forming apparatus 1, this extracted fax number and this data subjected to the conversion.

The image forming apparatus 1 is one example of the facsimile device as described above. In this embodiment, the image forming apparatus 1 is described as a so-called compound machine including a plurality of functions such as printing, copying, and faxing. The image forming apparatus 1 includes a communication function achieved by, for example, the LAN, and through this communication function, performs data transmission and reception to and from the information processor 2. The image forming apparatus 1 has a function of performing fax transmission to external facsimile devices F1, F2 . . . through, for example, a public phone line. Not only the image forming apparatus 1 but also an electronic device including a facsimile communication function can be used as this facsimile device.

The image forming apparatus 1, upon reception of the aforementioned fax number and transmission target data from the information processor 2, performs fax transmission of this transmission target data via a public line 81 to any of the external fax devices F1, F2 . . . indicated by this fax number.

As described above, the fax communication system 10 transmits the transmission target data including the cover sheet and the document created in the communication terminal device 3 from the communication terminal device 3 to the information processor 2 via the server 5, and in the information processor 2, performs, on this transmission target data, the aforementioned processing required for the fax transmission in the image forming apparatus 1 whereby the image forming apparatus 1 performs fax transmission of this transmission target data transmitted from the communication terminal device 3.

Figure 2:
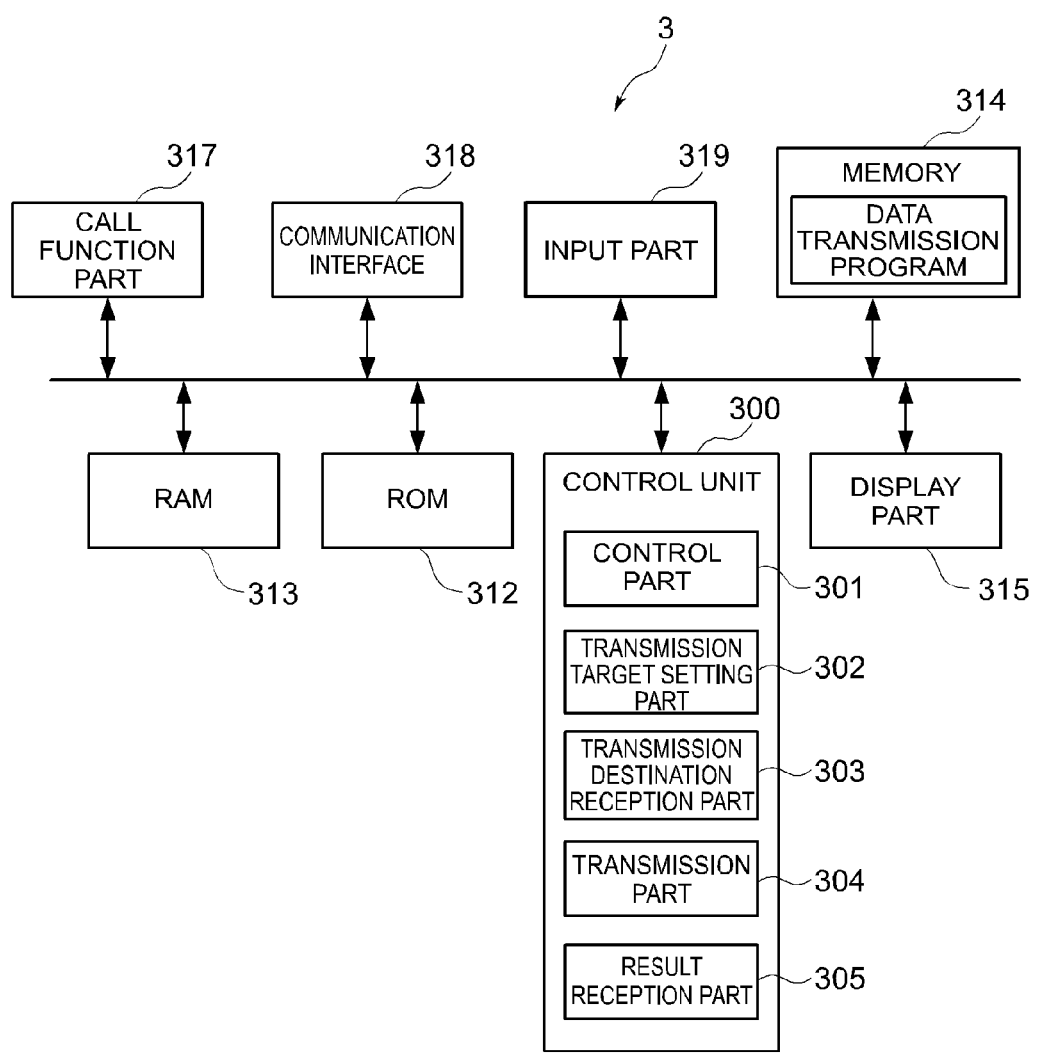
FIG. 2 is a block diagram showing schematic configuration of a communication terminal device.

Next, configuration of the communication terminal device 3 will be described. FIG. 2 is a block diagram showing schematic configuration of the communication terminal device 3.

The communication terminal device 3 includes: a control unit 300, a ROM 312, a RAM 313, a memory 314, a display part 315, a call function part 317, a communication interface 318, and an input part 319. These parts are capable of transmitting and receiving data or a signal to and from each other through a signal line (for example, CPU bus).

The control unit 300 is formed of, for example, a CPU. The ROM 312 stores operation programs for basic operation of the communication terminal device 3. The RAM 313 is used as, for example, an operation region of the control unit 300.

The memory 314 is a storage medium for storing various pieces of data and programs. In the memory 314, a data transmission program according to one embodiment of this disclosure is installed.

The control unit 300 operates in accordance with the data transmission program to thereby function as a control part 301 (of functions provided by the control part 301, those related to creation and transmission of data for fax transmission), a transmission target setting part 302, a transmission destination reception part 303, a transmission part 304, and a result reception part 305. Note that, however, these control part 301, transmission target setting part 302, transmission destination reception part 303, transmission part 304, and result reception part 305 of the control unit 300 may be each formed by a hard circuit without depending on the operation in accordance with the aforementioned transmission program.

The result reception part 305 serves as a component of the communication terminal device according to one example of this disclosure as long as it is required in the embodiment shown below.

The data transmission program is a program for specifying document data of, for example, a cover sheet and a document targeted for fax transmission performed by the image forming apparatus 1 and transmitting this data composed of, for example, the cover sheet and the document to the server 5, and making the image forming apparatus 1 to acquire it therefrom. The aforementioned data transmission program may perform a function of receiving, via the server 5, history information indicating a history of fax transmissions in the image forming apparatus 1.

The control part 301 is in charge of operation control of the various parts included in the communication terminal device 3.

The transmission destination reception part 303 receives, from the operator, a fax number as transmission destination information indicating a destination of the fax transmission performed by the image forming apparatus 1.

The transmission target setting part 302, based on an instruction inputted from the operator through operation of the input part 319, sets transmission target data targeted for the fax transmission performed by a predefined image forming apparatus (the image forming apparatus 1 is previously stored in the transmission target setting part 302 in this embodiment). For example, the transmission target setting part 302 receives, as transmission target data, document data specified through the operation of the input part 319 by the operator from among pieces of document data of cover sheets and copies which have been created by the document creation application provided in the communication terminal device 3 and which have been stored in the memory 314.

Moreover, the transmission target setting part 302 is also one example of a transmission history reception part in the scope of claims. In this embodiment, the input part 319 receives an instruction from the operator by a touch panel function provided at a display screen portion of the display part 315.

Moreover, the transmission target setting part 302 holds models as cover sheets, and from among the models, receives, as transmission target data, the model indicating the cover sheet specified through the operation of the input part 319 by the operator. The transmission target setting part 302, including an address name and a cover sheet comment inputted through the operation of the input part 319 by the operator and further a fax number as transmission destination information received by the transmission destination reception part 303, creates document data as this cover sheet.

The transmission part 304 transmits, to the server 5, the transmission target data composed of the cover sheet and the document including the aforementioned fax number. The transmission part 304 has a mailer function, and transmits this transmission target data in an e-mail format to the server 5. The transmission part 304 transmits, to the server 5, the aforementioned transmission target data together with a mail address specific to the image forming apparatus 1 indicating that a delivery destination of this transmission target data is the image forming apparatus 1. That is, the mail address specific to the image forming apparatus 1 serves as a delivery instruction which is given to the server 5 by the communication terminal device 3 and which is provided for delivering the aforementioned transmission target data to the image forming apparatus 1.

The result reception part 305 receives, from the image forming apparatus 1 via the server 5, transmission result information indicating a result of fax transmission in the image forming apparatus 1. The result reception part 305 saves this received transmission result as a transmission history (indicating Transmission Succeeded, Transmission Failed, Discontinued, etc.), together with transmission target data targeted for the fax transmission indicated by this transmission result, into the memory 314. The result reception part 305 saves this received fax transmission result as the transmission history into the HDD memory 314 (storages unit).

The server 5 is a typical mail server, and executes a function of a mail transfer agent (MTA) for destination sorting and a mail delivery agent (MDA) for delivering the sorted mail to a user in the server or another sever.

Figure 3:
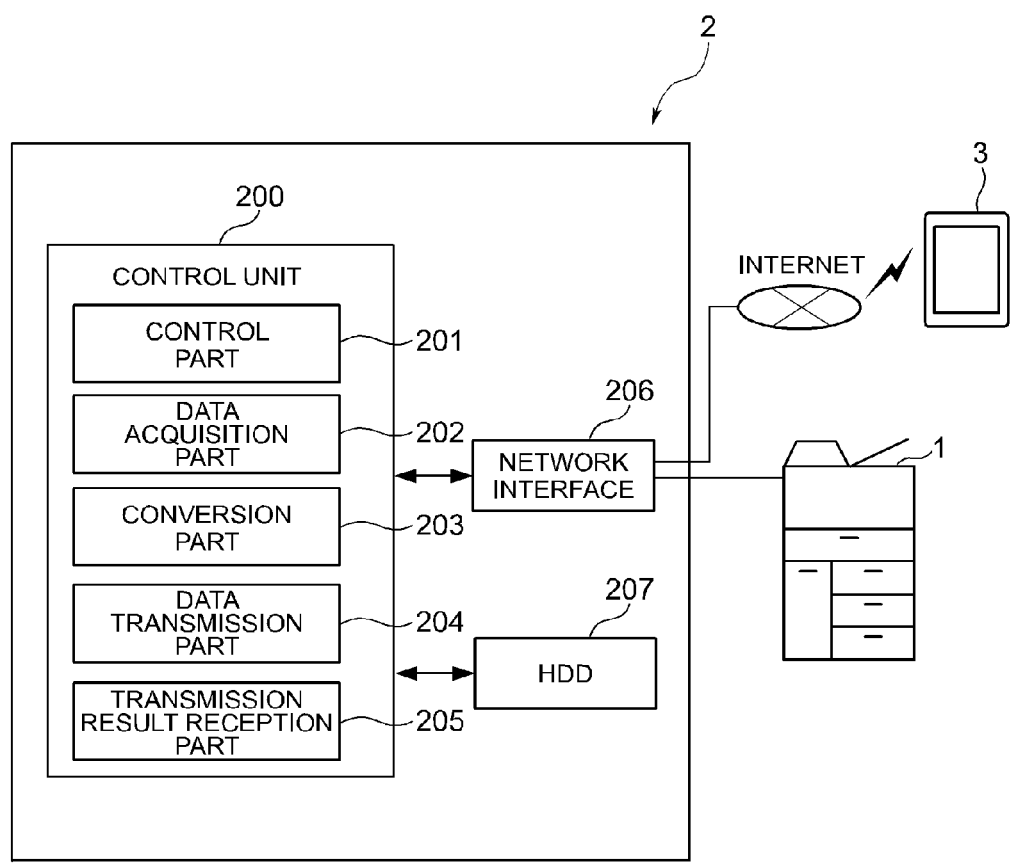
FIG. 3 is a schematic block diagram showing configuration of an information processor.

Next, configuration of the information processor 2 will be described. FIG. 3 is a schematic block diagram showing the configuration of the information processor 2. Here, of functions of the information processor 2, those related to fax transmission control will be described.

The information processor 2 includes: a control unit 200, a network interface 206, and an HDD 207.

The control unit 200 is composed of a CPU, a ROM, a RAM, etc. The control unit 200 operates in accordance with the fax transmission control program stored in the HDD 207 and thereby functions as a control part 201 (of functions provided by the control part 201, those related to fax transmission control), a data acquisition part 202, a conversion part 203, a data transmission part 204, and a transmission result reception part 205. Note that, however, these control part 201, data acquisition part 202, conversion part 203, data transmission part 204, and transmission result reception part 205 of the control unit 200 may be each configured by a hard circuit without depending on the operation in accordance with the aforementioned fax transmission control program.

The transmission result reception part 205 serves as a component of the communication terminal device according to one example of this disclosure as long as it is required in the embodiment shown below.

The control part 201 is in charge of overall operation control of the information processor 2.

The data acquisition part 202 acquires, from the server 5, transmission target data targeted for fax transmission performed in the image forming apparatus 1. Specifically, the data acquisition part 202, every preset time, accesses the server 5 via the rooter 6 and the Internet, and acquires, as the transmission target data, a mail provided with the aforementioned mail address specific to the image forming apparatus 1.

Moreover, the data acquisition part 202 extracts a fax number as transmission destination information from document data of a cover sheet forming part of the aforementioned transmission target data. For example, the data acquisition part 202 detects a predefined keyword, for example, "an address number" in the document data of the cover sheet, and extracts, as the fax number, a following number with a predefined number of digits.

The conversion part 203 converts the aforementioned transmission target data into data in a data format formed of a print format applied in the image forming apparatus 1.

The data transmission part 204 transmits: to the image forming apparatus 1 via the network interface 206, the aforementioned extracted fax number as the transmission destination information; and the transmission target data already subjected to the conversion into the data in the aforementioned print format by the conversion part 203. Moreover, the data transmission part 204 transmits, to the communication terminal device 3 via the server 5, the fax transmission result received from the image forming apparatus 1 by the transmission result reception part 205. The data transmission part 204 is also one example of a result transmission part in the scope of claims.

The transmission result reception part 205 receives, from the image forming apparatus 1 via the server 5, a fax transmission result for the transmission target data transmitted to the image forming apparatus 1 by the data transmission part 204.

The network interface 206, at time of communication with the server 5 via the Internet and communication with the image forming apparatus 1 via the LAN, performs processing required for these communications.

The HDD 207 stores the aforementioned fax transmission control program and the transmission target data in the mail format received from the aforementioned server 5.

Figure 4:
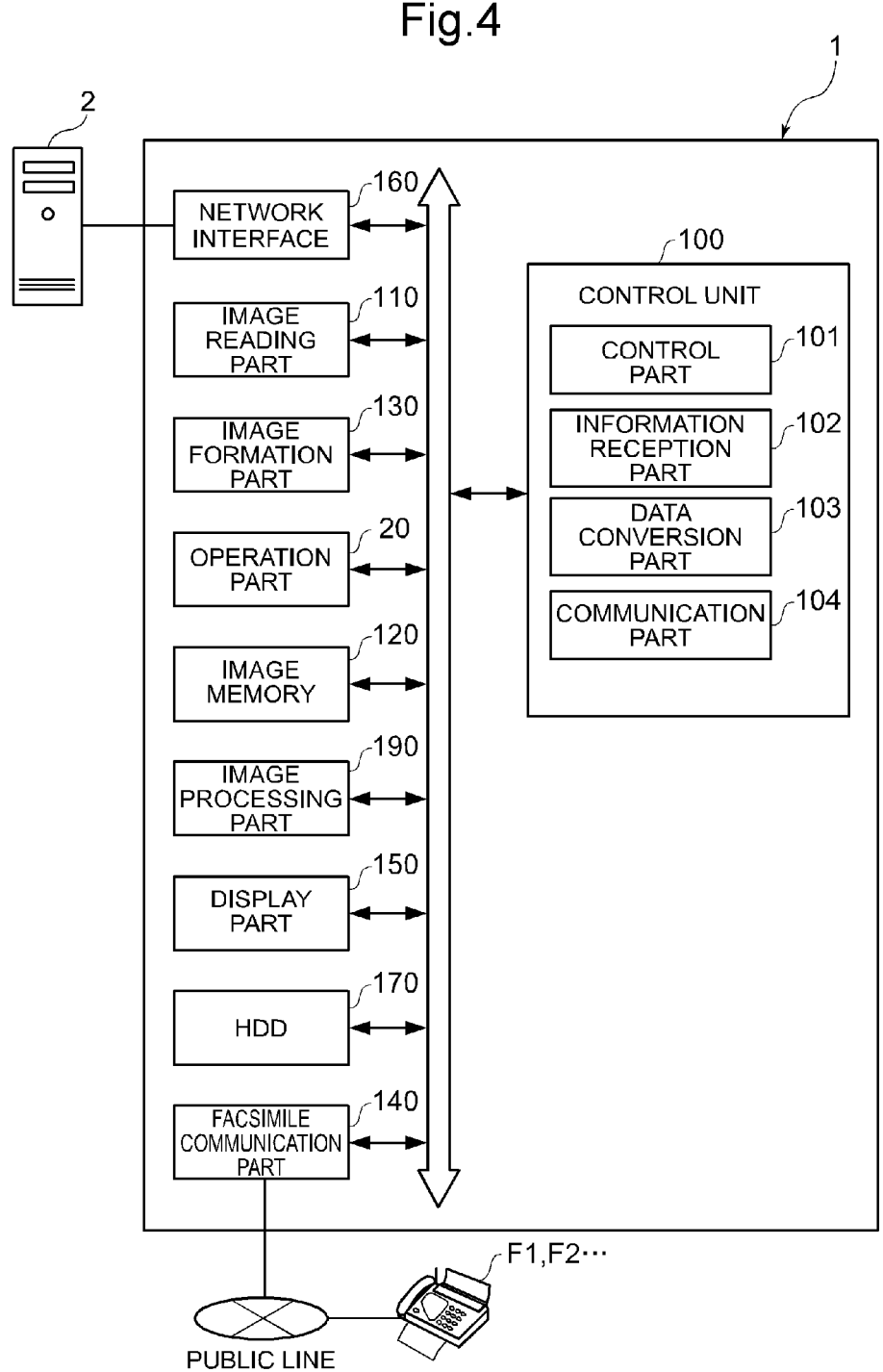
FIG. 4 is a block diagram showing an outline of inner configuration of an image forming apparatus.

Next, configuration of the image forming apparatus 1 will be described. FIG. 4 is a block diagram showing an outline of inner configuration of the image forming apparatus 1.

The image forming apparatus 1 includes: a control unit 100 controlling functions of various parts of the apparatus; the aforementioned image reading part 110; an image memory 120 temporarily storing, for example, data of a document image read by the image reading part 110; an image formation part 130; an operation part 20; and a display part 150 formed of an LCD (Liquid Crystal Display). The operation part 20 receives input of various operation execution instructions from the operator.

Moreover, the image forming apparatus 1 includes: a network interface 160, a facsimile communication part 140, an HDD 170, an image memory 120, and an image processing part 190.

The facsimile communication part 140 executes various functions required for fax communication, and transmits and receives image data to and from the external facsimile devices F1, F2, . . . through the public line 81.

The HDD 170 stores: for example, transmission target data for fax transmission received from the information processor 2, its fax number indicating a transmission destination; and image data acquired through reading by the image reading part 110. Note that the transmission target data for the fax transmission received from this information processor 2 and the fax number indicating the transmission destination of the transmission target data may be saved in the image memory 120.

The network interface 160 receives, for example, transmission target data targeted for fax transmission performed by the facsimile communication part 140 and its fax number.

The image processing part 190 performs, for example, editing/working (coding/decoding processing, enlargement/reduction processing, compression/extension processing) processing.

The control unit 100 includes: a CPU; a ROM storing operation programs of the various parts of the apparatus, such as a control program for controlling image formation operation; a RAM storing various pieces of data and functioning as a work region; and a memory such as a nonvolatile memory storing set values of various control parameters, and as a result of executing the operation program stored in the ROM by this CPU, the control unit 100 is in charge of operation of the various parts of the apparatus.

The control unit 100 includes: a control part 101, an information reception part 102, a data conversion part 103, and a communication part 104.

For example, the control unit 100 operates in accordance with the fax transmission program stored in the HDD 170 to thereby function as the aforementioned control part (of functions provided by the control part 101, a functional portion where control related to the present fax transmission is performed) 101, an information reception part 102, a data conversion part 103, and a communication part 104. The control unit 100 may, with a hardware circuit, include the aforementioned control part 101, information reception part 102, data conversion part 103, and communication part 104.

The control part 101 controls various mechanisms included in the image forming apparatus 1, and is in charge of overall operation control of the image forming apparatus 1. Moreover, the control unit 101 performs control of each operation required for fax transmission to be described below.

The information reception part 102 receives: from the information processor 2 via the network interface 160, transmission target data which has been converted into data in a predefined, applied print data format and which is targeted for fax transmission performed by the facsimile communication part 140; and a fax number as transmission destination information indicating a transmission destination of the present fax transmission.

The data conversion part 103 converts the transmission target data received by the information reception part 102 into data in a data format, for example, raster data, which permits the fax transmission performed by the facsimile communication part 140. The aforementioned facsimile communication part 140 performs fax transmission of the transmission target data, which is formed in the data format obtained through the conversion by the data conversion part 103, to the external facsimile device indicated by the aforementioned fax number.

The communication part 104, after the fax transmission of the aforementioned transmission target data by the facsimile communication part 140, acquires a result of the present fax transmission from the facsimile communication part 140, and transmits this transmission result to the information processor 2 via the network interface 160.

Figure 5:
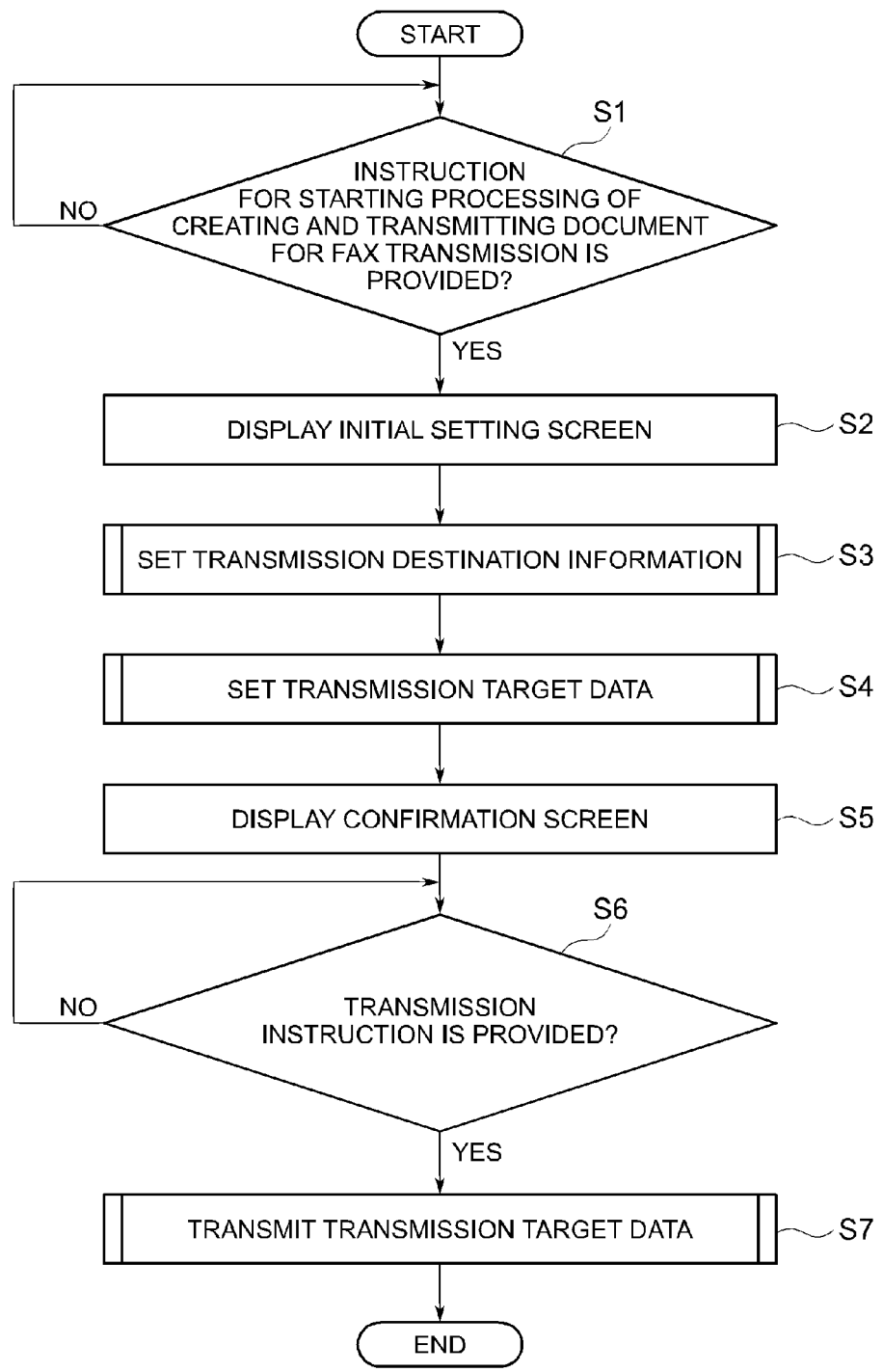
FIG. 5 is a flow chart showing a general outline of processing of creating and transmitting a document for fax transmission in the communication terminal device.
Figure 6:
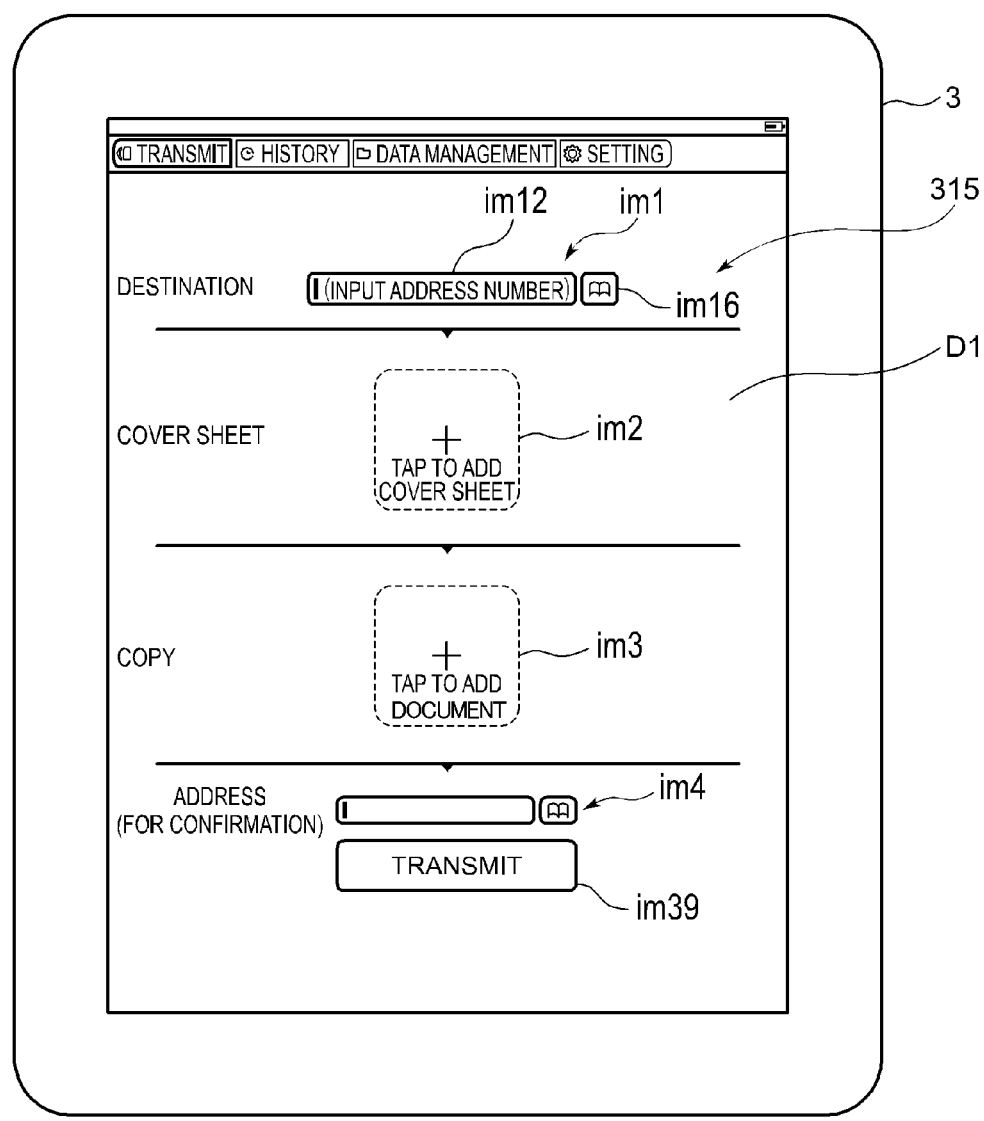
FIG. 6 is a diagram showing one example of a display screw of a display part in the communication terminal device.
Figure 7:
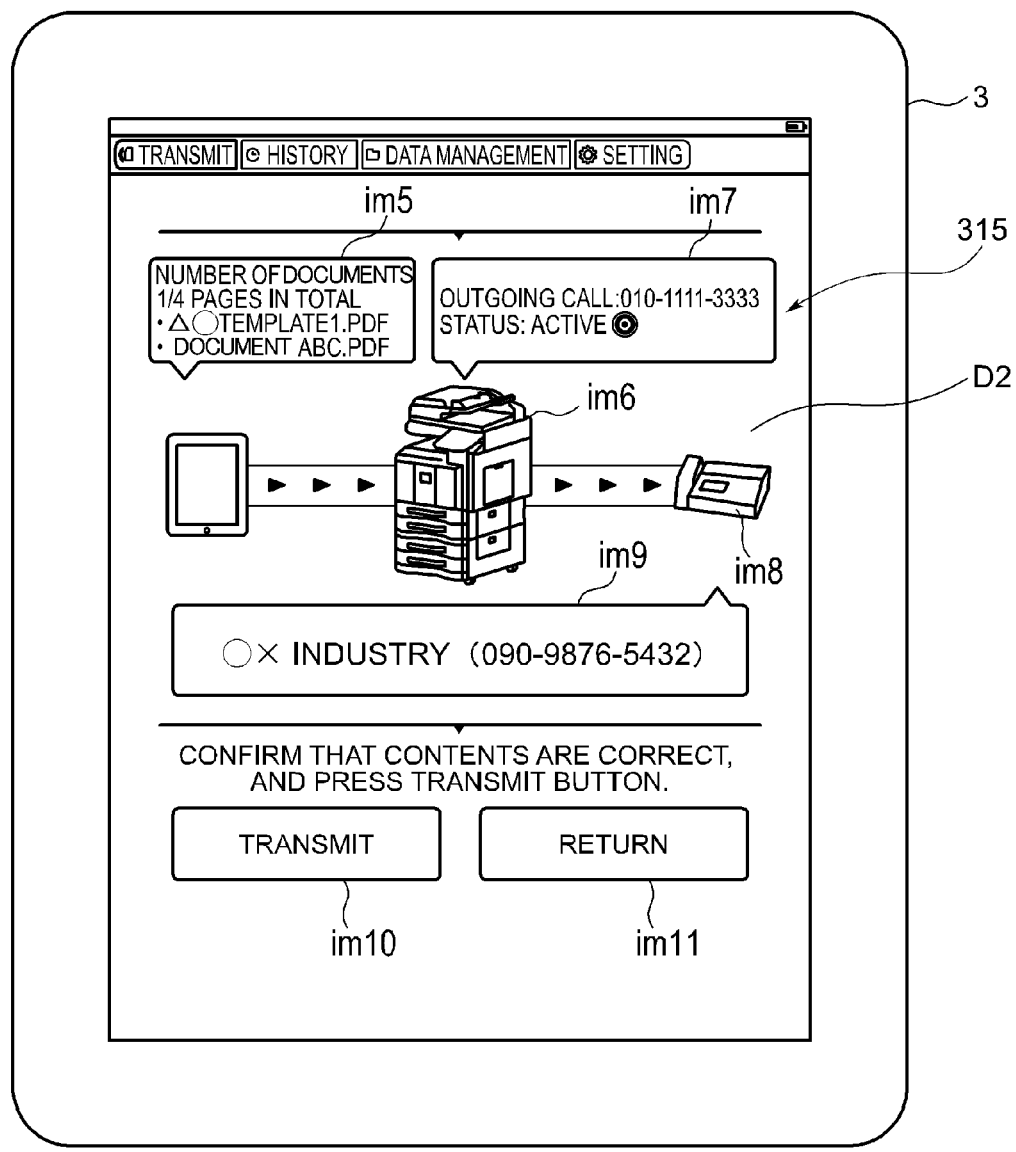
FIG. 7 is a diagram showing one example of a display screen of the display part in the communication terminal device.

Next, an outline of the processing of creating and transmitting a document for fax transmission in the communication terminal device 3 will be described. FIG. 5 is a flow chart showing the outline of the processing of creating and transmitting a document for fax transmission in the communication terminal device 3. FIGS. 6 and 7 are diagrams each showing one example of a display screen of the display part 315 in the communication terminal device 3.

If an instruction for starting the processing of creating and transmitting a document for fax transmission is inputted through operation of the input part 319 of the communication terminal device 3 by the operator (YES in S1), the control part 301 displays, at the display part 315, an initial setting screen for creating a document for fax transmission (S2).

For example, as shown in FIG. 6, the initial setting screen D1 displays; an image im1 for receiving address input an image im2 for receiving an instruction for creating a cover sheet; an image im3 for receiving an instruction for creating a document; and an image im4 for confirming inputted address information by the operator.

Here, if an address, that is, a fax number as transmission destination information is inputted and set by the touch panel function through press operation of the aforementioned image im1 by the operator (S3), and if a cover sheet and a document targeted for transmission are received through operation of the aforementioned images im2 and im3 by the operator and they are set as transmission target data (S4), the control part 301 displays, at the display part 315, a confirmation screen D2 for the operator to confirm information related to the cover sheet and the document targeted for the transmission (S5). The fax number as the transmission target data inputted through operation by the operator to be described below is written into document data as the cover sheet.

This confirmation screen D2 has an image im5 indicating information related to the document serving as transmission target data and information related to the cover sheet as the transmission target data. Moreover, the confirmation screen D2 has an image im6 for indicating that this transmission target data transmitted by communication terminal device 3 is targeted for fax transmission performed by the image forming apparatus 1. Arranged near this image im6 is an image im7 indicating an operation status of the image forming apparatus 1 based on information received from the image forming apparatus 1 via, for example, the server 5. Further displayed is an image im8 for indicating to the operator that a destination to which the transmission is performed via this image forming apparatus 1 is a facsimile device. Further, the confirmation screen D2 has an image im9 indicating a name and a fax number of a transmission destination of the fax transmission performed by the image forming apparatus 1.

This consequently makes it possible for the operator to confirm, before transmission of the aforementioned target data set for the server 5, whether or not there is any error in contents of this transmission target data.

This confirmation screen D2 further has: a Transmit button im10 for receiving, from the operator, an instruction for executing transmission of this transmission target data towards the image forming apparatus 1 via the server 5; and a "Return" button im11 for cancelling set contents indicated by these images im5 to im9 and returning to a state in which an address, a cover sheet, and a document can be set again.

Moreover, if an instruction for transmitting the transmission target data set at this point is received by the display part 315 by the touch panel function as a result of operation, such as pressing, of the aforementioned Transmit button im10 by the operator (YES in S6), the transmission part 304 transmits, to the server 5 via a communication interface 318, the transmission target data including the fax number as the transmission destination information (S7). In other words, the transmission part 304 transmits the transmission target data including the fax number towards the image forming apparatus 1 via the server 5.

The outline of the processing performed by the information processor 2 when the image forming apparatus 1 is urged by the fax communication system 10 to perform fax transmission has been described above. Processing performed upon fax transmission by the fax communication system 10 will be described below, individually referring to the communication terminal device 3, the information processor 2, and the image forming apparatus 1.

Figure 8:
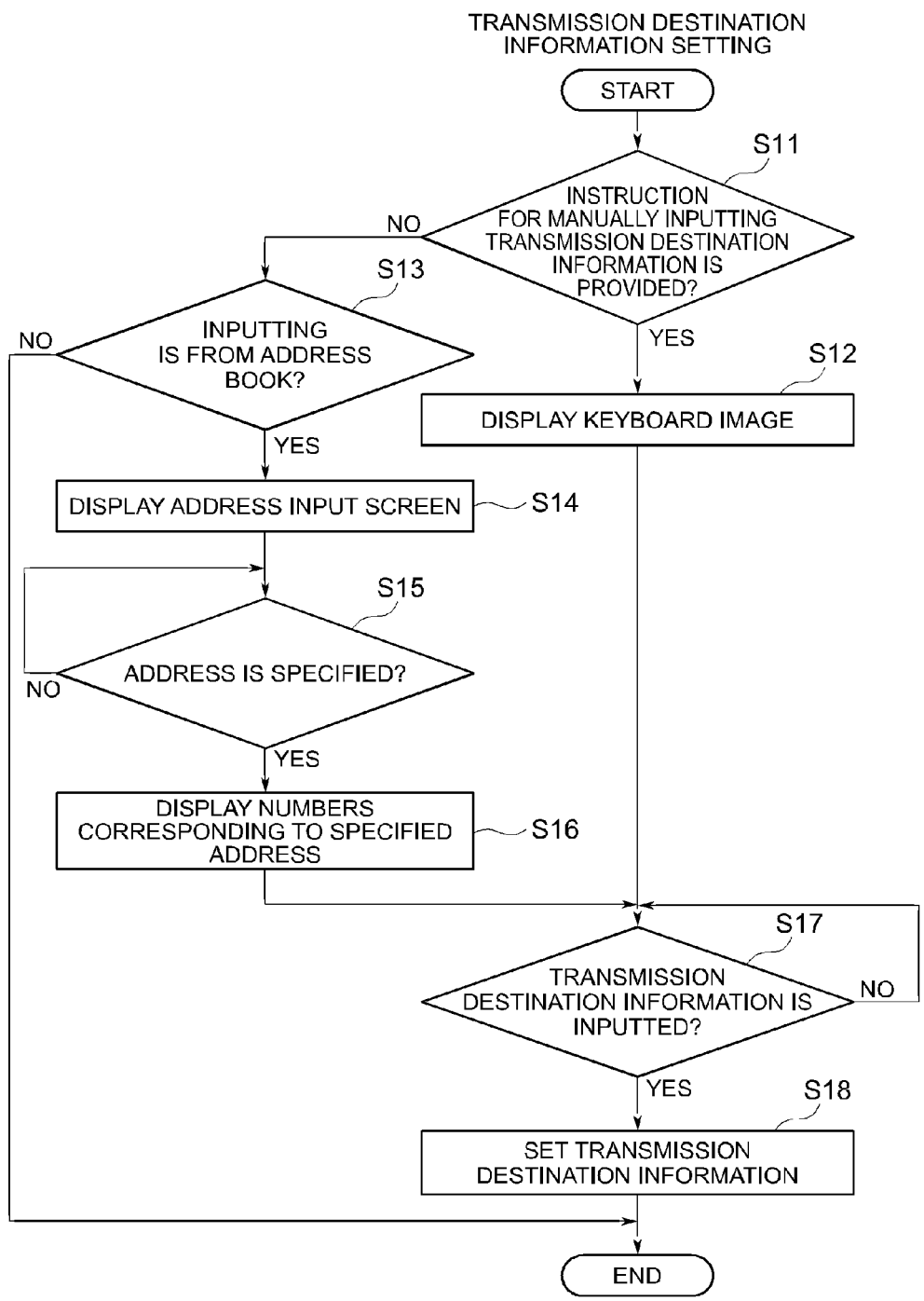
FIG. 8 is a flow chart showing transmission destination information setting processing.
Figure 9:
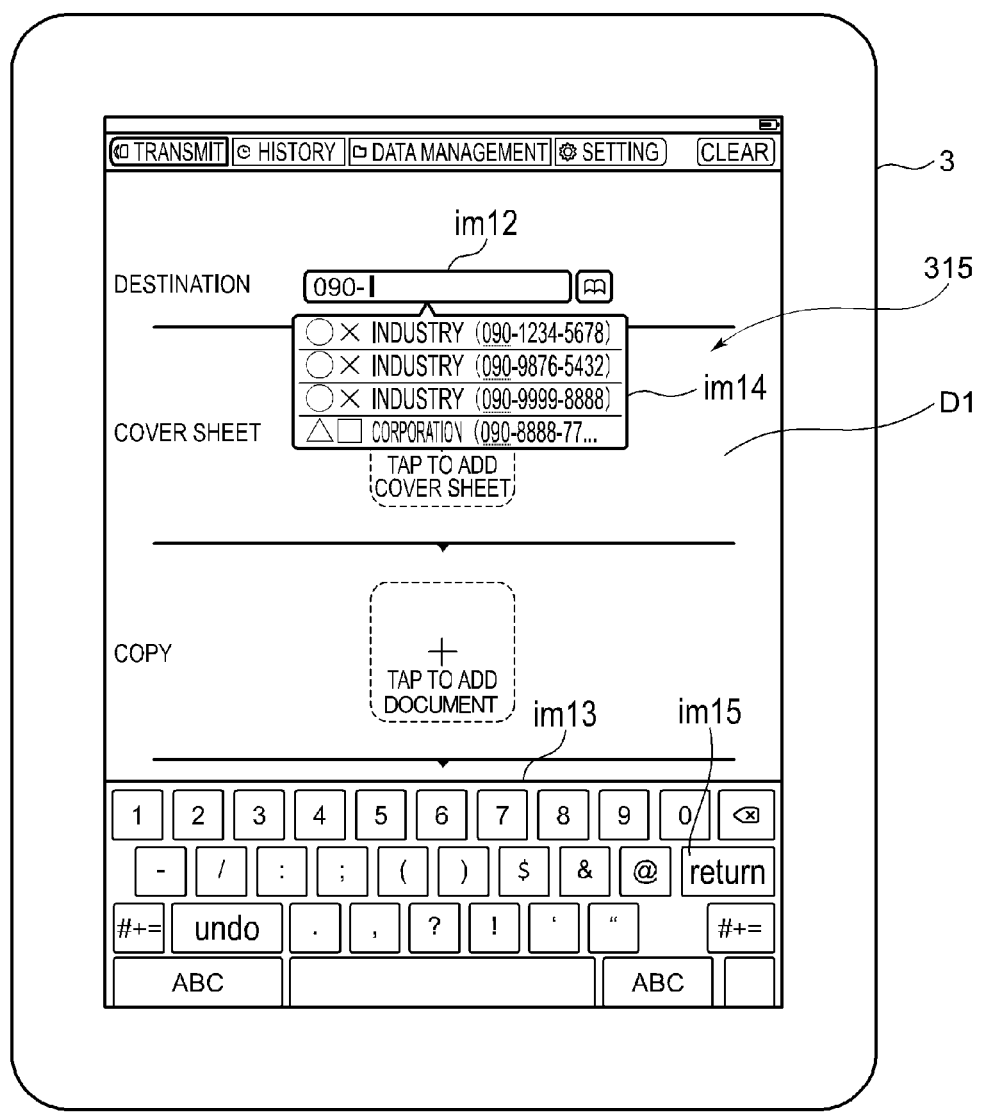
FIG. 9 is a diagram showing one example of a display screen of the display part in the communication terminal device.
Figure 10:
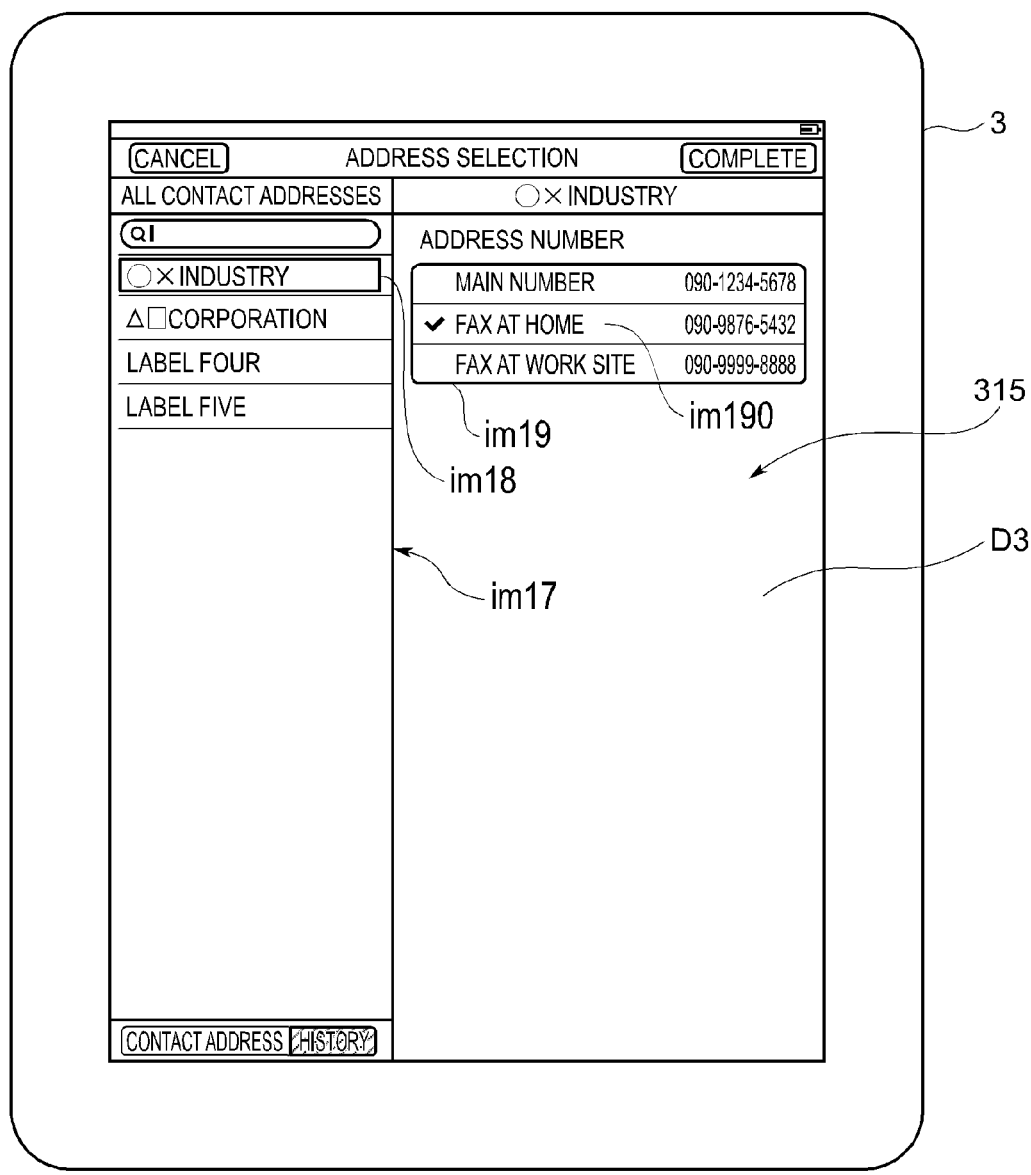
FIG. 10 is a diagram showing one example of a display screen of the display part in the communication terminal device.

Next, transmission destination information setting processing included in the aforementioned processing of creating and transmitting a document for fax transmission in the communication terminal device 3 will be described. FIG. 8 is a flow chart showing the transmission destination information setting processing. FIGS. 9 and 10 are diagrams each showing one example of a display screen of the display part in the communication terminal device.

For example, if an instruction for setting transmission destination information by manual input is inputted from the operator as a result of, for example, pressing a rectangular portion im12 of the image im1 for address input on the initial setting screen D1 shown in FIG. 6 above (YES in S11), the control part 301 displays, at the display part 315, a keyboard image im13 for receiving input of a fax number by the touch panel function as a result of touch operation on the display screen of the display part 315 by the operator (S12).

Here, if the fax number is inputted by the touch operation of the keyboard image im13 by the operator (YES in S17), this fax number is received by the transmission destination reception part 303 and set as transmission destination information (S18).

By referring to an address book stored in the memory 314 of the communication terminal device 3 or based on a log of fax numbers inputted in the past, upon every input of one digit for the fax number by the operator as described above, the control part 301 displays, at a position near the rectangular portion im12 on the initial setting screen D1, an image im14 indicating candidate fax numbers, that is, fax numbers partially matching this already inputted fax number. At a point in time at which the desired fax number is displayed on the image im14, if the operators presses a display portion of this desired fax number and then the image im15 indicating a Return key, this desired fax number is received as transmission destination information by the transmission destination reception part 303.

Moreover, if an instruction for specifying a fax number as transmission destination information from the address book is inputted from the operator by, for example, pressing an address book image im16 of the image im1 for address input on the initial setting screen D1 shown in FIG. 6 above (NO in S11, YES in S13), the control part 301 displays, at the display part 315, a destination selection screen D3 having an image im17 indicating a list of contact addresses stored in the address book, as shown in an example of FIG. 10 (S14). If the instruction for specifying a fax number based on the address book is not inputted by the operator (NO in S13), the processing ends.

Here, if the operator presses an image im18 indicating an image portion (for example, "○× Industry") displaying an address which is included in the address list shown on the image im17 and which is desired to be a transmission destination, for example, the "○× Industry" is inputted as an address corresponding to this image im18 (YES in S15), and the control part 301 displays, at the display part 315, as candidate transmission destinations, a display image im19 indicating the numbers stored in the address book in correspondence with the address "○× Industry" (S16).

If the operator presses, from among these candidates, for example, a display portion im190 indicating a desired number as transmission destination (YES in S17), the number in correspondence with this pressed display portion im190 is inputted, and the transmission destination reception part 303 receives this number and sets it as the fax number as transmission destination information (S18). The control part 301 then switches the display screen of the display part 315 to the initial setting screen D1.

Figure 11:
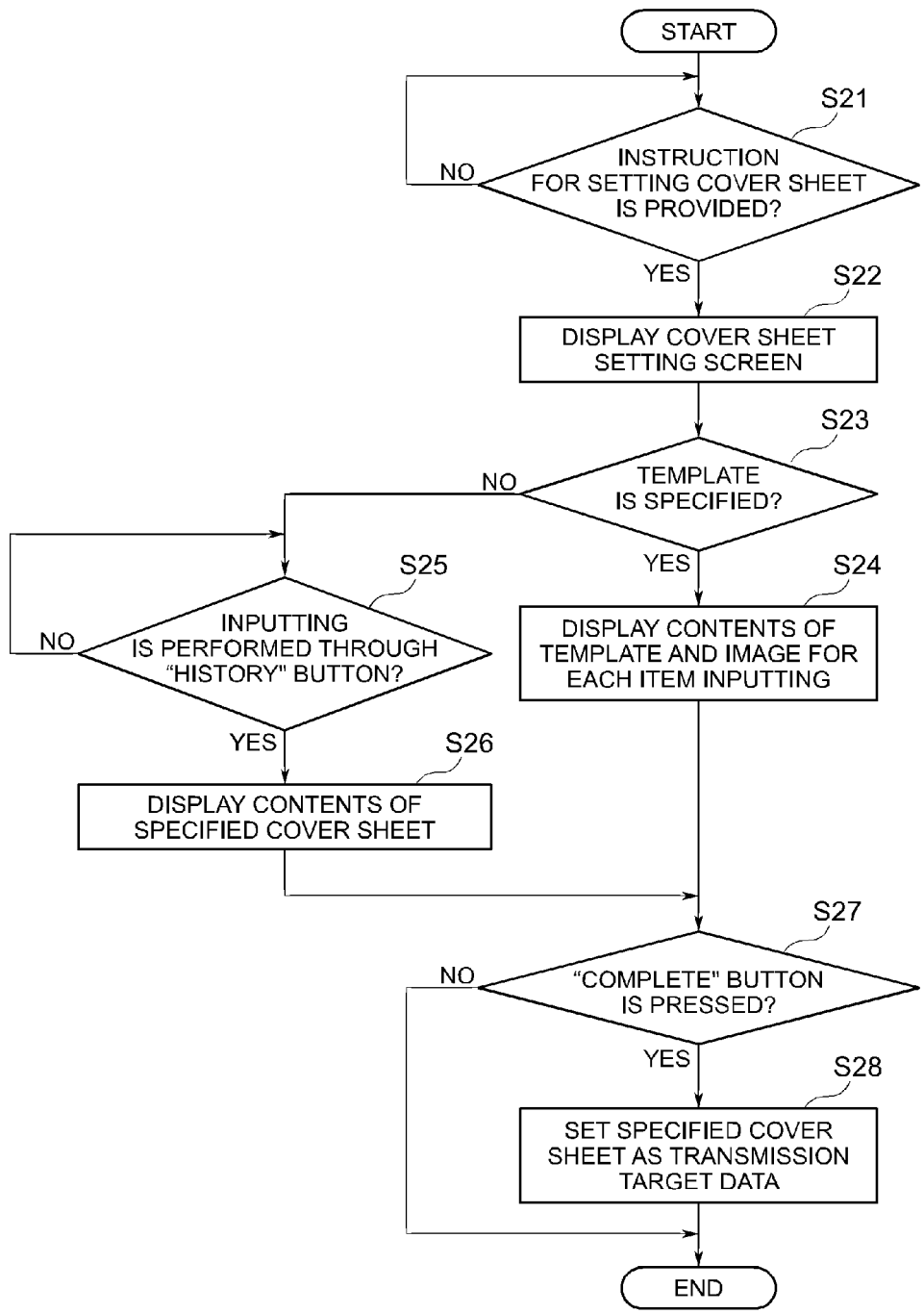
FIG. 11 is a flow chart showing cover sheet setting processing.
Figure 12:
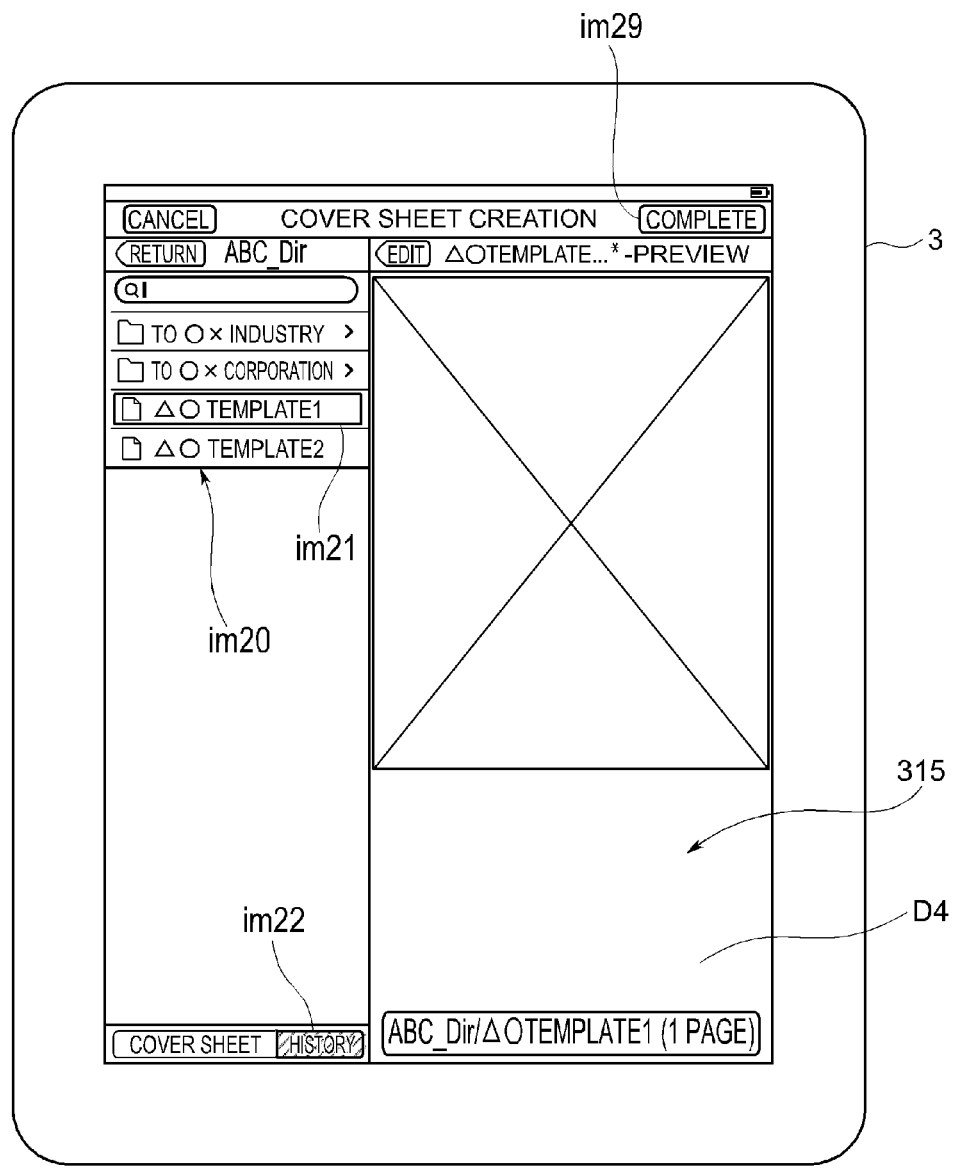
FIG. 12 is a diagram showing one example of a display screen of the display part in the communication terminal device.
Figure 13:
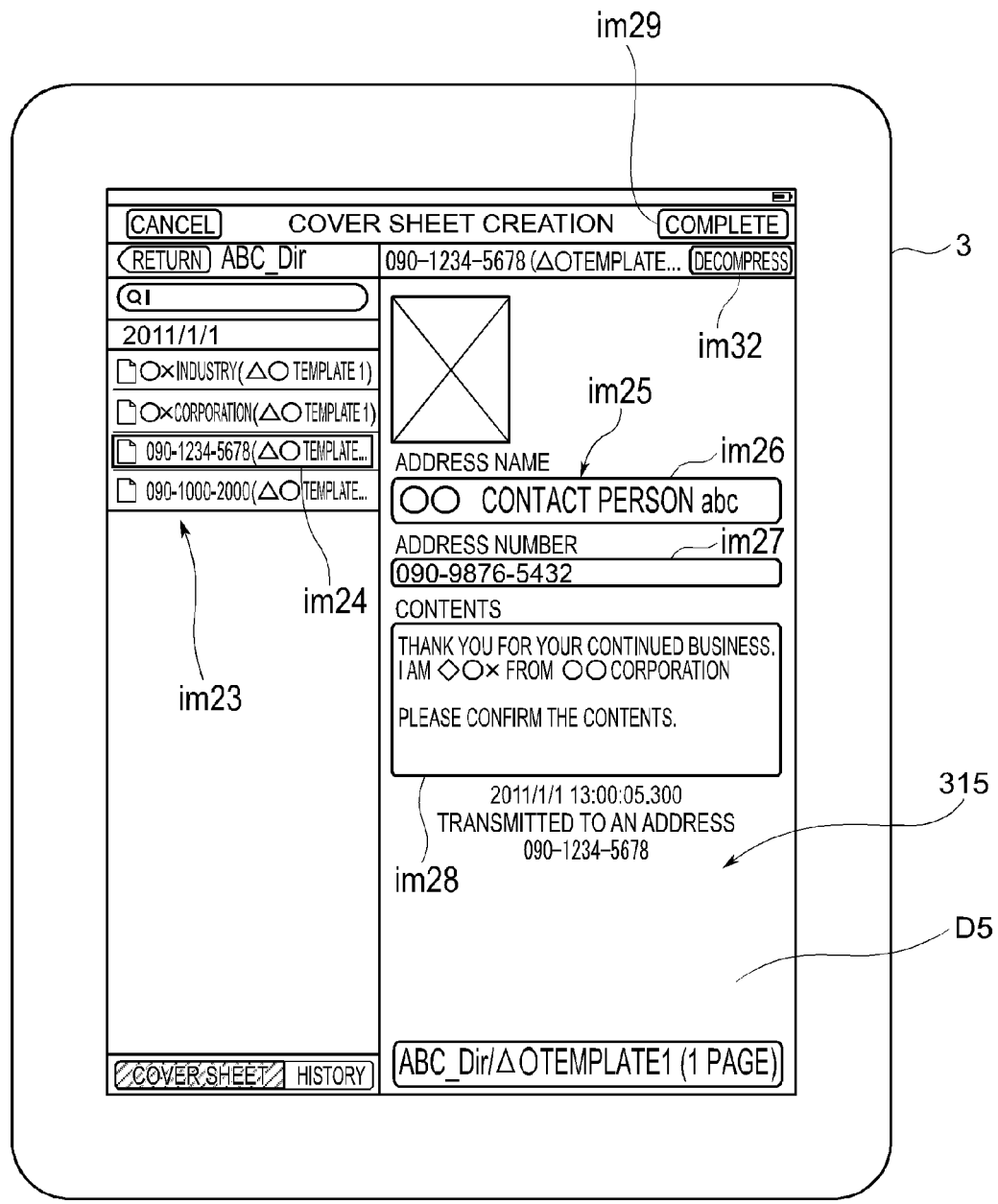
FIG. 13 a diagram showing one example of a display screen of the display part in the communication terminal device.

Next, cover sheet setting processing in the aforementioned processing of creating and transmitting a document for fax transmission in the communication terminal device 3 will be described. FIG. 11 is a flow chart showing the cover sheet setting processing. FIGS. 12 and 13 are diagrams each showing one example of a display screen of the display part in the communication terminal device.

For example, if an instruction for setting a cover sheet is inputted from the operator by, for example, pressing the image im2 for receiving an instruction for creating a cover sheet on the initial setting screen D1 shown in FIG. 6 above (YES in S21), the control part 301 displays, at the display part 315, a cover sheet setting screen D4 as shown in an example in FIG. 12 (S22).

For example, the control part 301 displays an image im20 indicating a list of names of different templates of cover sheets held by the transmission target setting part 302. Here, if the operator presses a display portion im21 which is included in the image im20 and which has the name indicating the template of a model used for the present fax transmission, specification of the model indicated by this display portion im21, "Δ○ template" here is inputted (YES in S23), and the control part 301 displays contents of the model "Δ○ template" at the display part 315 (S24).

Moreover, the control part 301 displays a "History" image im22 on the cover sheet setting screen D4. If this "History" image im22 is pressed by the operator, as shown in an example in FIG. 13, the control part 301 displays, at the display part 315, a cover sheet setting second screen D5 having a transmission history list image im23 indicating different transmission histories already stored in the memory 314.

If the specification of the model "Δ○ template" is not inputted in S23 (NO in S23), S24 is not performed, and the processing proceeds to S25 to be described below.

If the operator presses the display portion im24 which is included in the transmission history list image im23 and which indicates the transmission destination used for the present fax transmission (YES in S25), specification of a transmission destination and a cover sheet indicated by the transmission history displayed by this display portion im24 is inputted and an image im25 indicating these contents is displayed at the display part 315 (S26). The control part 301 displays, as the image im25, an address name image im26 indicating an address name, an address number image im27 indicating an address number, and a comment image im28 indicating a cover sheet comment.

The transmission target setting part 302 does not receive input of an address name, an address number (fax number), and a comment while the cover sheet setting second screen D5 and the image im25 are displayed. The control part 301 displays a "Decompress" image im32 on the cover sheet setting second screen D5, and upon pressing of this "Decompress" image im32 by the operator, displays an input screen for an address name, an address number (fax number), or a comment, and when this input screen is displayed, the transmission target setting part 302 receives input of an address name, an address number (fax number), or a comment from the operator. This consequently can avoid a state in which the operator is confused between cover sheet contents indicated by the past transmission history and cover sheet contents newly inputted or created at this point.

After the template contents display in S24 or the cover sheet contents display based on the transmission history in S26, if the operator presses a Complete button im29 displayed at the display part 315 by the control part 301 (YES in S27), at this point, a confirmation instruction for confirming as a transmission target the cover sheet whose contents are displayed at the display part 315 is received by the transmission target setting part 302, and the transmission target setting part 302 sets, as transmission target data used for the present fax transmission, a cover sheet whose contents are indicated by this confirmation instruction (S28). As described above, the operator can set the cover sheet by operation based on the aforementioned transmission history display, which therefore makes it easy to perform operation of setting a cover sheet serving as transmission target data. Then the control part 301 switches the display screen of the display part 315 to the initial setting screen D1.

After the aforementioned template contents display in S24 or the cover sheet contents display based on the transmission history in S26, if the operator does not press the Complete button im29 and the instruction for confirming a cover sheet as transmission target data is not inputted (NO in S27), the setting made up to this point is canceled and the processing ends.

The transmission target setting part 302 includes, in the document data of the cover sheet, the fax number as the transmission target data received by the transmission destination reception part 303.

Figure 14:
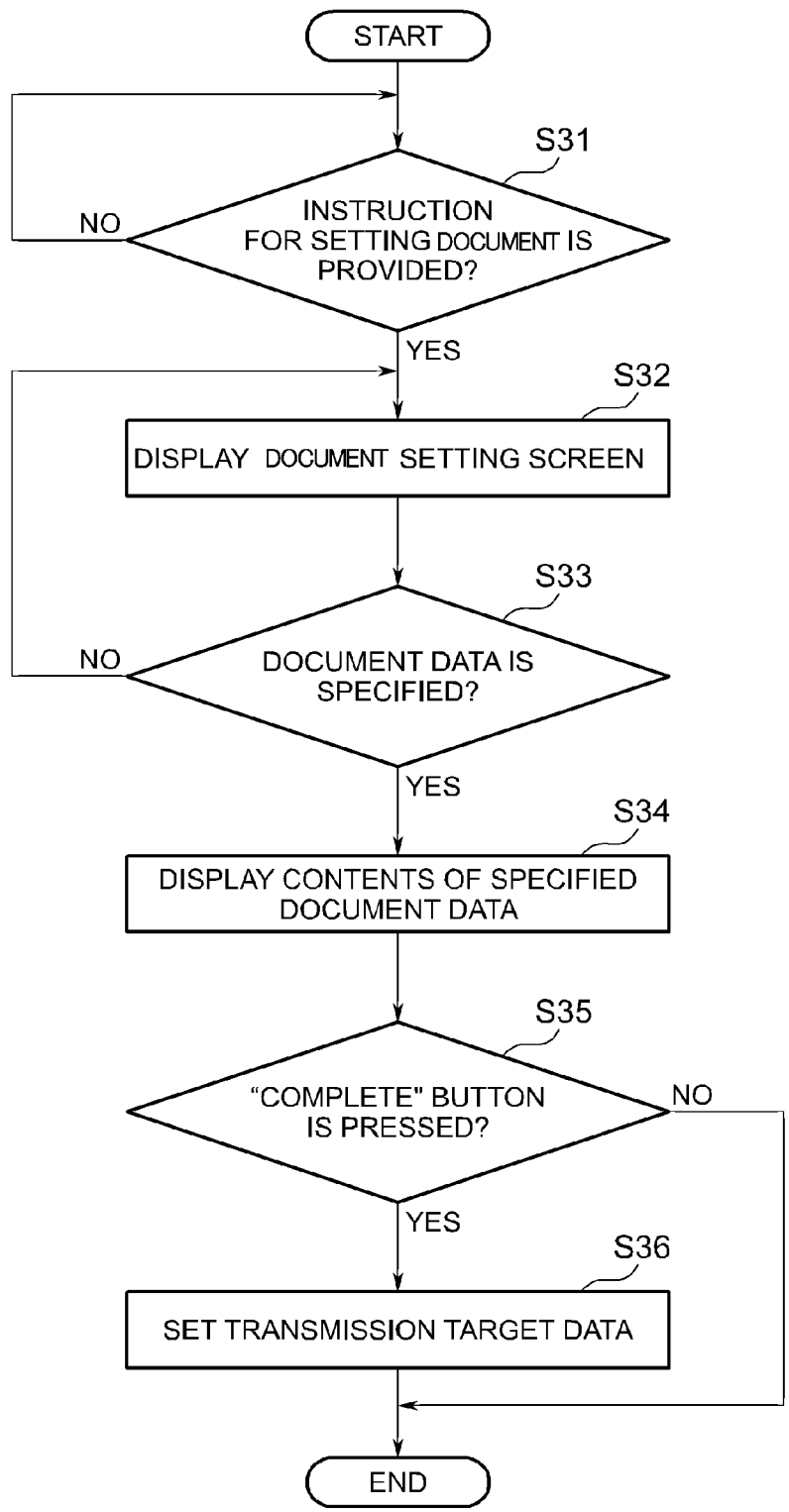
FIG. 14 is a flow chart showing document setting processing.
Figure 15:
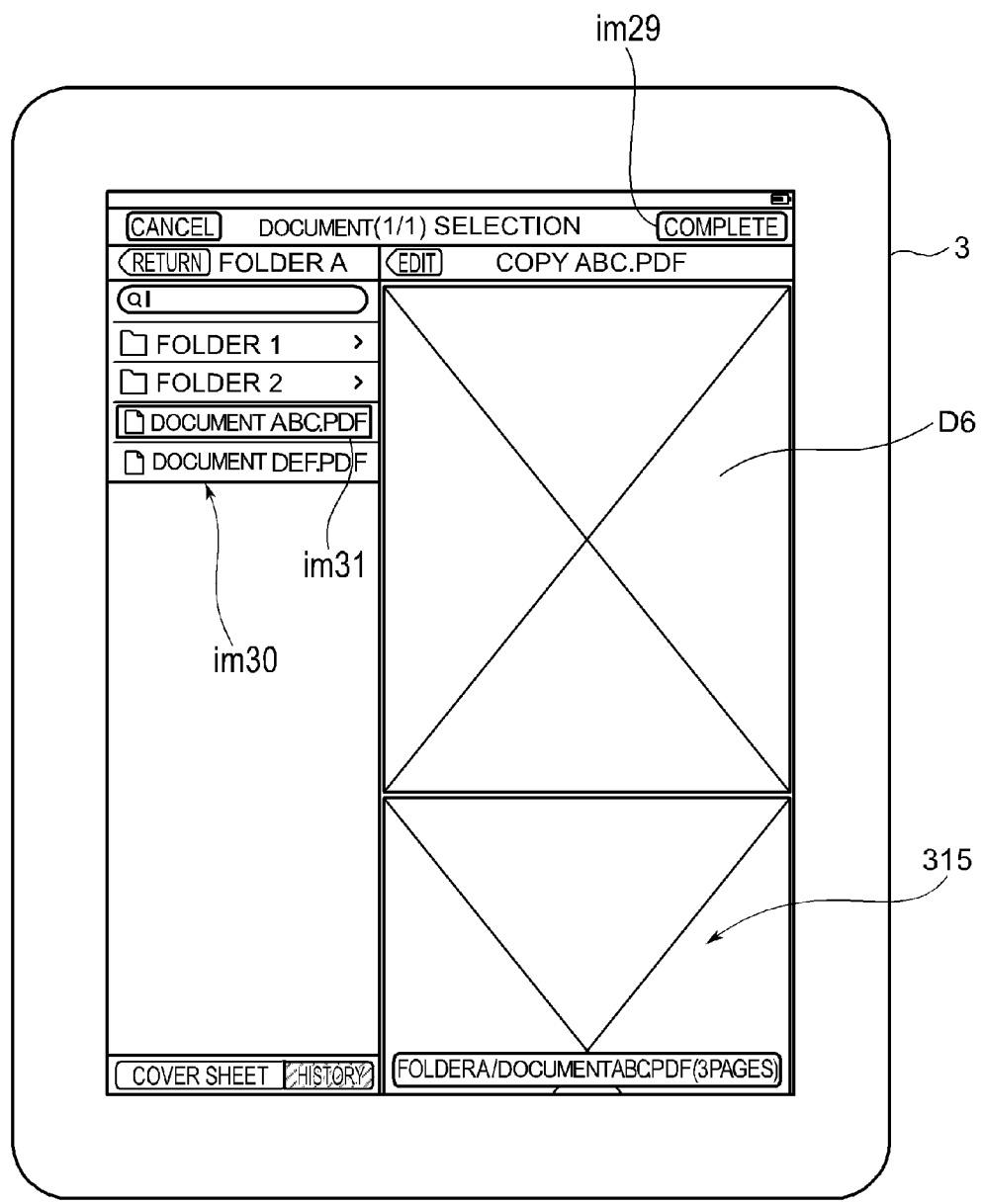
FIG. 15 a diagram showing one example of a display screen of the display part in the communication terminal device.

Next, document setting processing in the aforementioned processing of creating and transmitting a document for fax transmission in the communication terminal device 3 will be described. FIG. 14 is a flow chart showing the document setting processing. FIG. 15 is a diagram showing one example of a display screen of the display part in the communication terminal device 3.

For example, if an instruction for setting a document is inputted from the operator by, for example, pressing the image im3 for receiving an instruction for creating a cover sheet on the initial setting screen D1 shown in FIG. 6 above (YES in S31), the control part 301 displays, at the memory 315, a document setting screen D6 as shown in an example in FIG. 15 (S32).

For example, the control part 301 displays an image im30 indicating a list of names of pieces of document data stored in folders (created in the memory 314) specified by the transmission target setting part 302. The control part 301 displays the aforementioned document setting screen D6 at the display part 315 until specification of document data, for example, "Document ABC" is inputted (NO in S32, S33), and if the operator presses a display portion im31 of the image im30 with the name indicating document data of a document used for the present fax transmission, specification of the document data, the document data "Document ABC" here, which is indicated by this display portion im31 is inputted (YES in S33), and contents of the document data "Document ABC" are displayed at the display part 315 by the control part 301 (S34).

Here, if a Complete button im29 is pressed by the operator (YES in S35), the transmission target setting part 302 sets this displayed document data as a document as transmission target data (S36). Then the control part 301 switches the display screen of the display part 315 to the initial setting screen D1.

If the operator presses a display portion of the image im30 with the name indicating different document data, the control part 301 displays, at the display part 315, the document data corresponding to this pressed display portion as a document candidate targeted for the transmission, and the processing proceeds to S33.

Moreover, if the operator does not press the Complete button im29 and the document is not confirmed as transmission target data (NO in S35), the processing ends.

Each document data stored in the aforementioned folders is, for example, created by the document creation application installed in the communication terminal device 3.

When the cover sheet and the document are set as described above, the transmission target setting part 302 converts these cover sheet and document into those in a predefined data format, for example, PDF for standardization. The following description is based on that the cover sheet and the document are converted into those in the PDF format.

Figure 16:
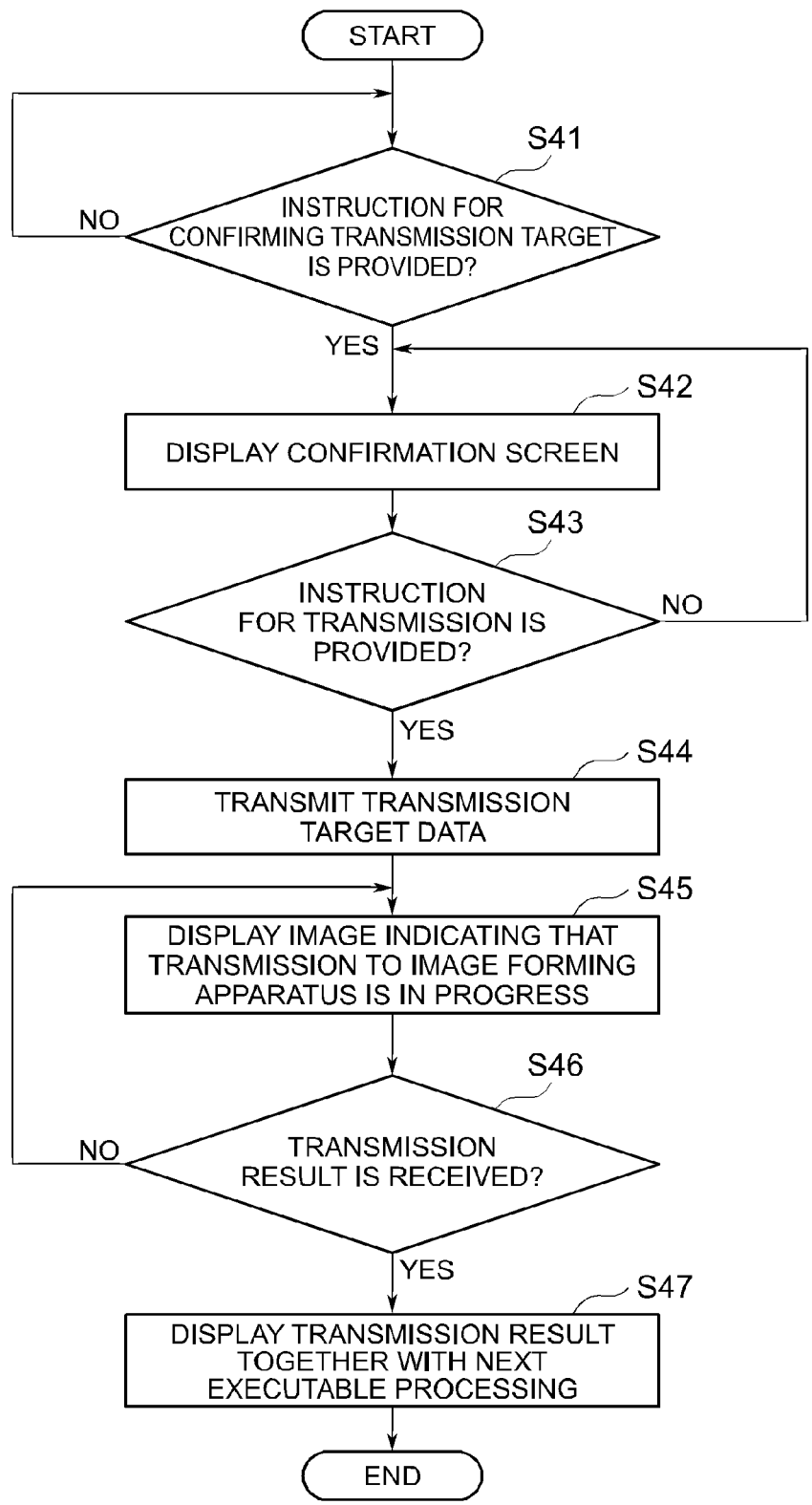
FIG. 16 is a flow chart showing transmission processing.
Figure 17:
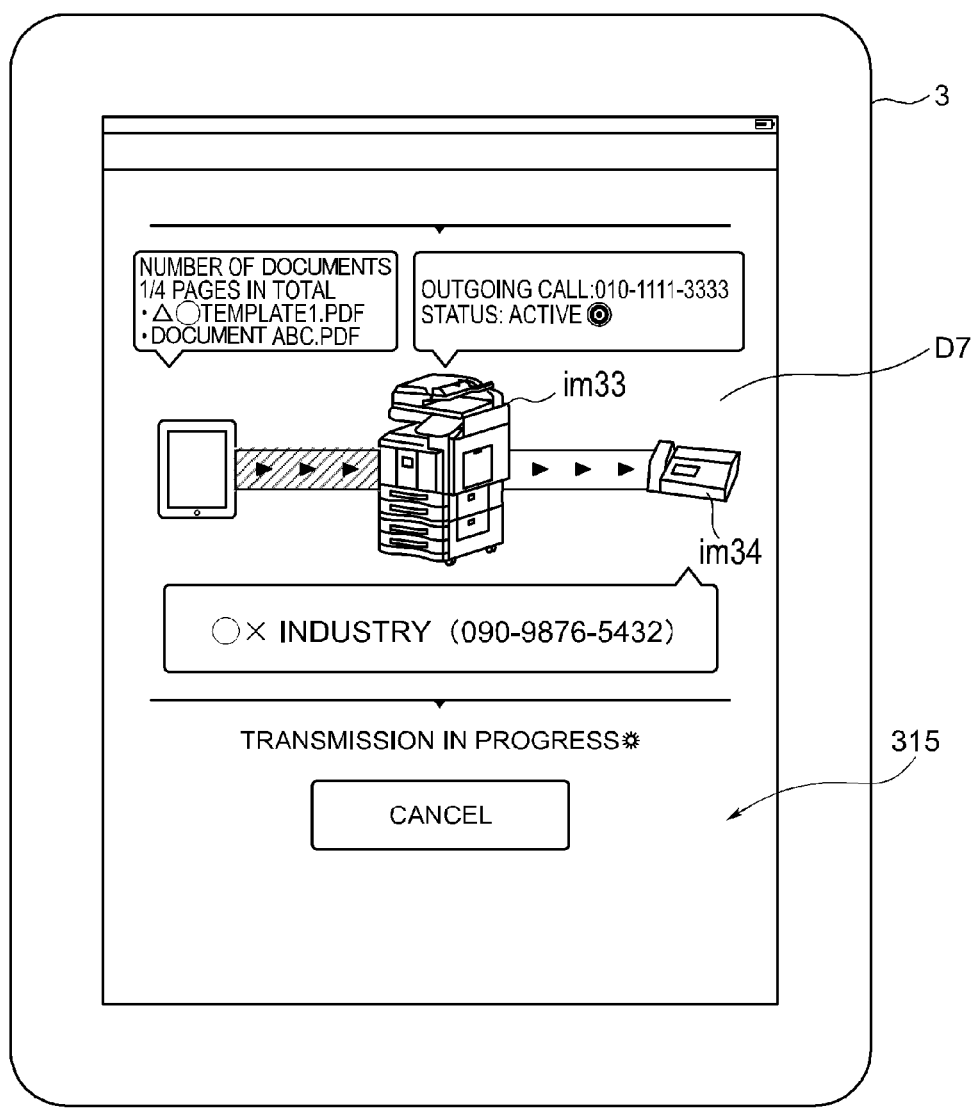
FIG. 17 a diagram showing one example of a display screen of the display part in the communication terminal device.
Figure 18:
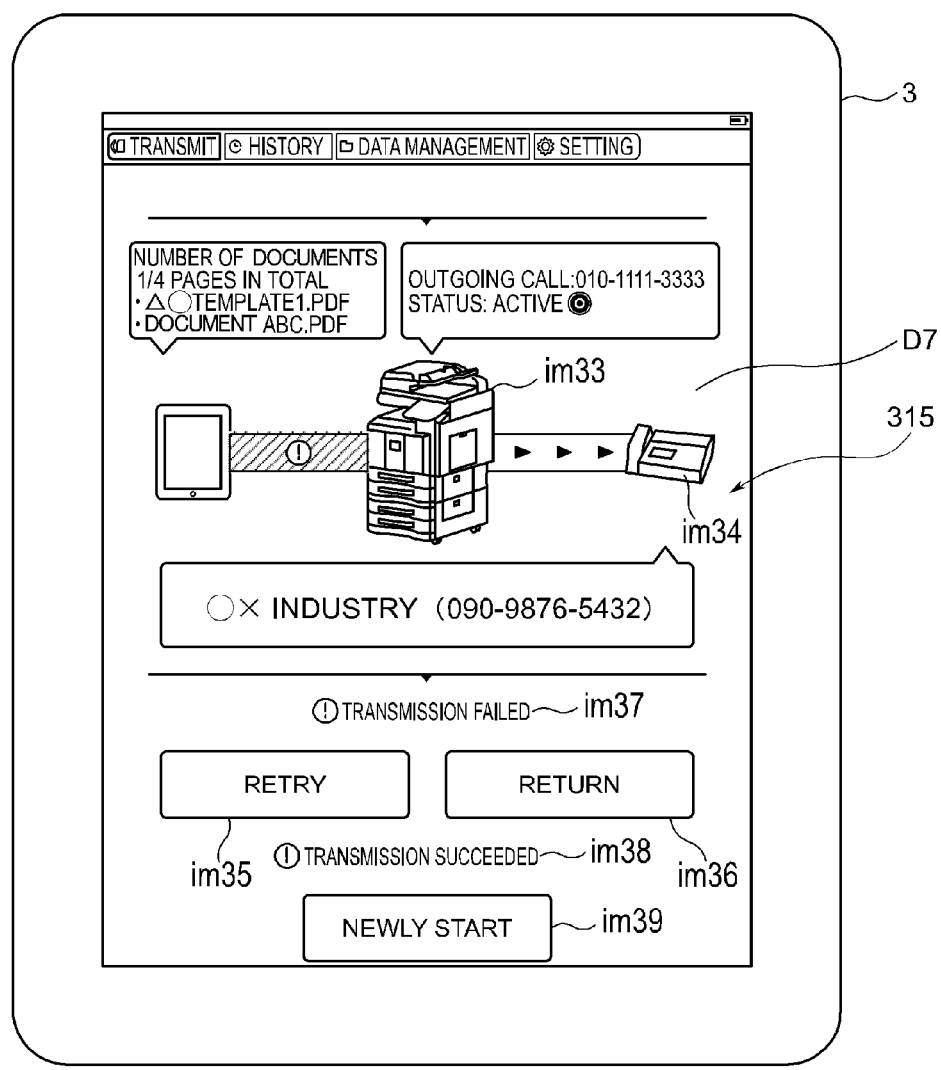
FIG. 18 a diagram showing one example of a display screen of the display part in the communication terminal device.

Next, transmission target data transmission processing in the aforementioned processing of creating and transmitting a document for fax transmission in the communication terminal device 3 will be described. FIG. 16 is a flow chart showing the transmission processing. FIGS. 17 and 18 are diagrams each showing one example of a display screen of the display part in the communication terminal device.

When the control part 301 displays the initial setting screen D1 shown in FIG. 6 at the display part 315 after ending of setting the fax number as the transmission destination information and the cover sheet and the document as the transmission target data as described above in the communication terminal device 3, if the operator presses a "Transmit" button im39 displayed on this initial setting screen D1, an instruction for transmitting the fax number, the cover sheet, and the document set at this point is received by the transmission part 304 (YES in S41).

If the aforementioned fax number, cover sheet, and document, in response to the aforementioned transmission instruction, are confirmed as the transmission target data to be transmitted towards the image forming apparatus 1 via the server 5, the control part 301 displays the confirmation screen D2 shown in FIG. 7 at the display part 315 (S42). The display of this confirmation screen D2 makes it possible for the operator to reconfirm the fax number, the cover sheet, and the document before actual execution of the transmission of this transmission target data.

Here, if the operator presses the "Transmit" transmission button im10 within the confirmation screen D2 and, based on this, the input part 319 receives input of an instruction for transmitting the aforementioned fax number, cover sheet, and document as the transmission target data to the transmission part 304 (YES in S43), the transmission part 304 transmits this transmission target data towards the image forming apparatus 1 via the server 5 (S44). Specifically, the transmission part 304 transmits, to the server 5 as the mail server, this transmission target data by its mailer function in a mail format in which a mail address specific to the image forming apparatus 1 is specified as a mail transmission destination. The image forming apparatus 1 as the mail transmission destination of this transmission target data and the mail address specific to the image forming apparatus 1 are previously stored in the transmission unit 304. Moreover, the transmission part 304 transmits, to the server 5, the transmission target data subjected to conversion into data in a PDF format.

The control part 301 displays the aforementioned confirmation screen D2 at the display part 315 until the input of the instruction for transmitting the aforementioned fax number, cover sheet, and document as the transmission target data is received by the input part 319 (NO in S42, S43).

During the processing of transmitting this transmission target data, the control part 301 displays, at the display part 315, a transmission status display screen D7 as shown in an example in FIG. 17 (S45). The transmission status display screen D7 has an image indicating that the transmission of the aforementioned transmission target data is in progress. The control part 301 displays, as the transmission status display screen D7, an image im33 clearly specifying that fax transmission of the aforementioned transmission target data to the destination indicated by the aforementioned fax number is performed by the image forming apparatus 1. Further, the control part 301 displays on the transmission status display screen D7 an image im34 indicating that fax transmission is performed from the image forming apparatus 1 to the facsimile device. This consequently permits the operator to recognize that the transmission destination of the transmission target data is the image forming apparatus 1 and the fax transmission is performed by the image forming apparatus 1.

In a state in which the control part 301 displays the transmission status display screen D7 at the display part 315 as described above, the result reception part 305 waits for arrival of a transmission result, indicating a result of the fax transmission of this transmission target data, in a mail format from the image forming apparatus 1 via the server 5 (NO in S45, S46). If the result reception part 305 receives this transmission result (YES in S46), the control part 301 displays, at the display part 315, contents indicating the transmission result, for example, "Transmission succeeded" or "Transmission failed", together with an image indicating next executable processing (S47).

For example, when the transmission result is "Transmission failed", as shown in an example in FIG. 18, a "Rewrite" button im35 and a "Return" button im36 are displayed on the transmission status display screen D7 together with an image im37 indicating "Transmission failed". This "Rewrite" button im35 is an image which indicates that retry processing of executing fax transmission again with similar transmission contents can be executed, and which is for receiving an instruction for executing this retry processing from the operator. Moreover, the "Return" button im36 is an image which indicates that processing of resetting a fax number, a cover sheet, and a document can be executed and which is for receiving an instruction for executing this resetting processing from the operator.

At this point, if the operator presses the "Rewrite" button im35 or the "Return" button im36, the processing proceeds to processing corresponding to the respective button. Moreover, in case of "Transmission succeeded", the control part 301 displays an image im38 indicating "Transmission succeeded" on the transmission status display screen D7, and displays, together therewith, a "Newly start" button im39 for receiving an instruction for executing new processing of setting a transmission destination, a cover sheet, and a document for making next fax transmission setting. This consequently makes it possible to quickly recognize and execute next processing to be performed after the fax transmission performed by the image forming apparatus 1.

Note that (1) the image im37 indicating "Transmission failed", the "Retry" button im35, and the "Return" button im36, and (2) the image im38 indicating "Transmission succeeded" and the "Newly start" button im39 are selectively displayed by the control part 301.

Moreover, the control part 301 stores, into the memory (storage part) 314, the aforementioned received transmission result as a transmission history of the fax transmission of the transmission target data targeted for the aforementioned fax transmission performed by the image forming apparatus 1, together with this transmission target data. This consequently makes it possible, upon later performance of fax transmission to the same transmission destination from the communication terminal device 3 to the image forming apparatus 1, for the image forming apparatus 1 to perform fax transmission by use of a transmission history and transmission target data stored in the memory 314.

As described above, with the communication terminal device 3 according to this embodiment, by setting a fax number, a cover sheet, and a document targeted for fax transmission performed by the image forming apparatus 1 in the communication terminal device 3, transmitting from the communication terminal device 3 to the server 5 transmission target data including this fax number as transmission destination information together with a mail address specific to the image forming apparatus 1, and transmitting this transmission target data from the server 5 to the image forming apparatus 1, it is possible for the image forming apparatus 1 to receive this transmission target data as a target for the fax transmission. This consequently makes it possible for the image forming apparatus 1 to execute fax transmission of this transmission target data as a target for the fax transmission.

For example, the operator can cause performance of fax transmission by the image forming apparatus 1 even without directly operating this image forming apparatus 1, and thus convenience of fax transmission by use of the image forming apparatus 1 improves. Moreover, it is also possible to perform fax transmission of the transmission target data set in the aforementioned communication terminal device 3 to a transmission destination even without using a server on the server providing fax transmission service, and thus costs required for performing fax transmission by the operator at a place where no image forming apparatus 1 is installed can be reduced as much as possible.

Figure 19:
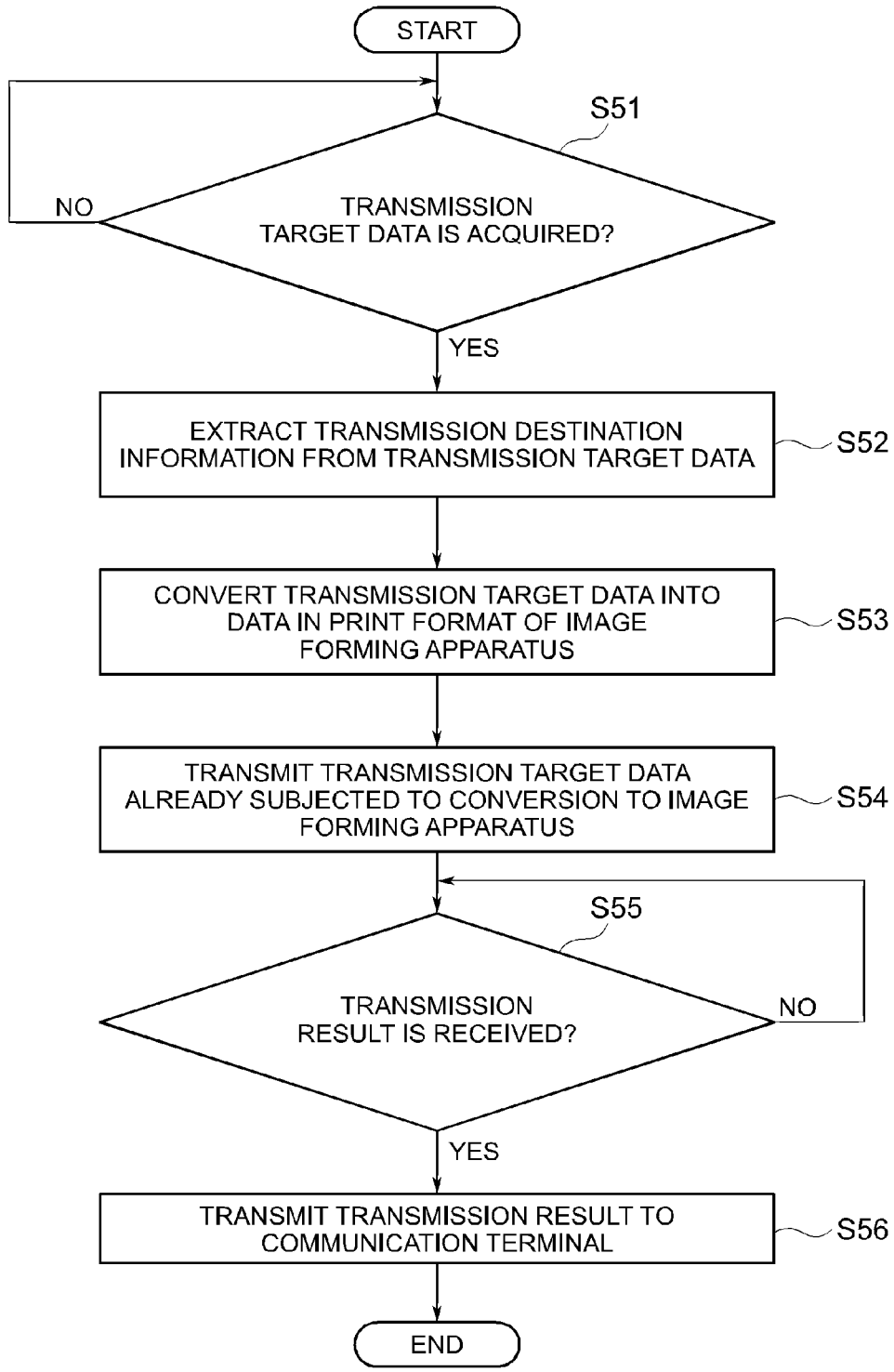
FIG. 19 is a flow chart showing processing performed by the image processor.

Next, processing of the information processor 2 in the fax transmission processing performed by the fax communication system 10 will be described. FIG. 19 is a flow chart showing the processing performed by the information processor 2.

As described above, the transmission target data transmitted from the communication terminal device 3 is received by the server 5 as the mail server, and is distributed by the server 5 to a mail address specified as a transmission destination of this transmission target data. The information processor 2 accesses the server 5 and acquires, from the server 5, an e-mail having a mail address specific to the image forming apparatus 1.

Specifically, if the information processor 2, by its network interface 206, accesses the server 5 via the network interface 206 and acquires, from the server 5 in a mail format, transmission target data for which the mail address specific to the image forming apparatus 1 is specified (YES in S51), this data acquisition part 202 analyzes this transmission target data and extracts included transmission destination information (S52).

Subsequently, the conversion part 203 converts the transmission target data acquired from the server 5 into data in a print data format applied in the image forming apparatus 1 (S53). The data transmission part 204 transmits, to the image forming apparatus 1 via the network interface 206, the transmission target data already subjected to the data conversion and a fax number as the transmission destination information extracted in S52 (S54).

After the transmission of the transmission target data to this image forming apparatus 1, the data acquisition part 202 waits for arrival of a transmission result of the fax transmission for this transmission target data from the image forming apparatus 1 (S55). If the data acquisition part 202 receives this transmission result from the image forming apparatus 1 (YES in S55), the data transmission part 204 transmits this transmission result in a mail format to the communication terminal device 3 via the server 5.

With the information processor 2 according to this embodiment, the data acquisition part 202 extracts the fax number as the transmission destination information from the transmission target data acquired from the server 5, the conversion part 203 converts this transmission target data into the data in the print data format applied in the image forming apparatus 1, and the data transmission part 204 transmits these fax number and transmission target data to the image forming apparatus 1. Therefore, the transmission destination information required for fax transmission performed by the image forming apparatus 1 and the data suitable for the fax transmission are provided to the image forming apparatus 1, making it possible to perform fax transmission of this transmission target data via the public line in the image forming apparatus 1.

Figure 20:
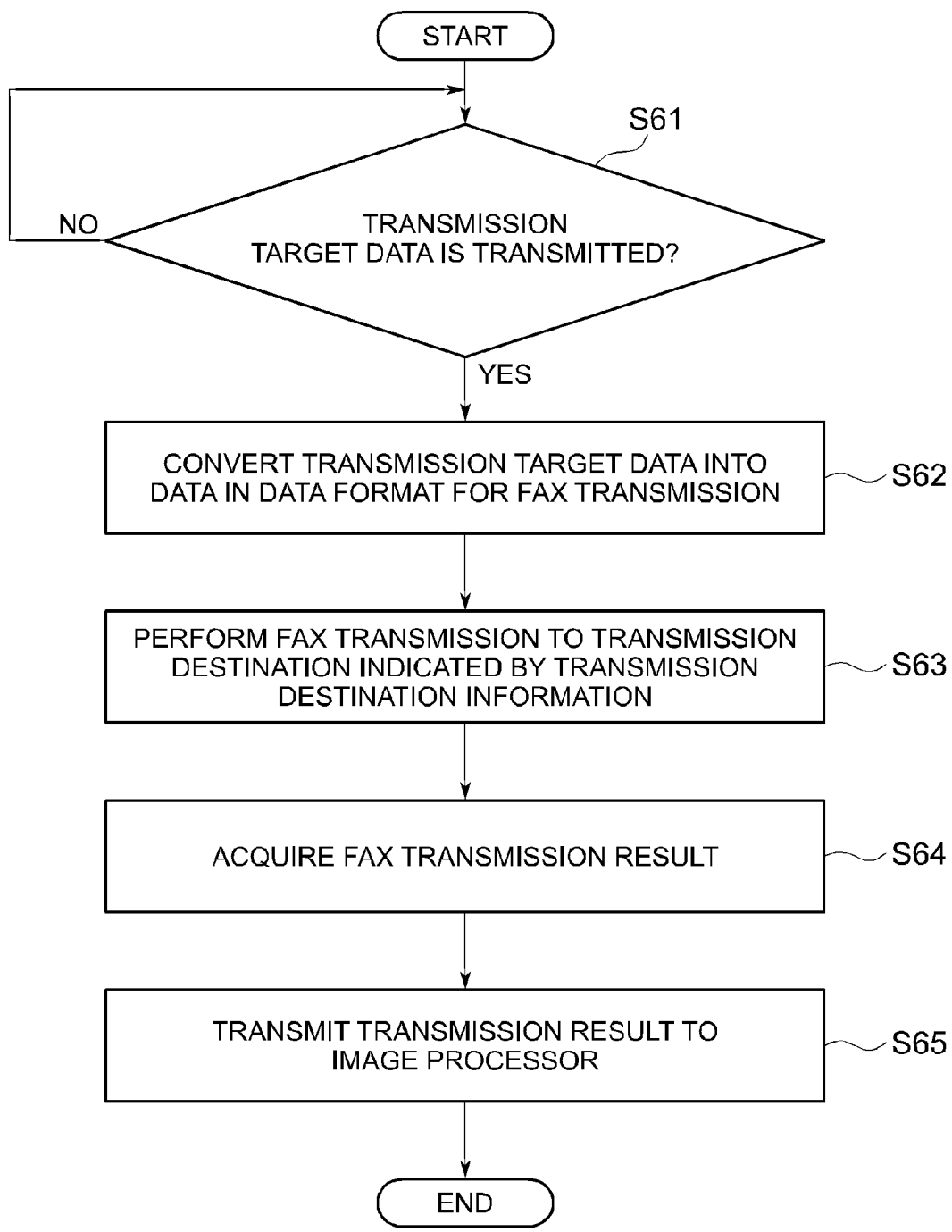
FIG. 20 is a flow chart showing processing performed by the image forming apparatus.

Next, processing of the image forming apparatus 1 in the fax transmission processing performed by the fax communication system 10 will be described. FIG. 20 is a flow chart showing the processing performed by the image forming apparatus.

If the information reception part 102 in the image forming apparatus 1 receives, from the information processor 2 via the network interface 160, the transmission target data already subjected to the conversion into the data in the aforementioned print format (YES in S61), the data conversion part 103 converts this transmission target data into data in, for example, a raster format that permits fax transmission (S62). The facsimile communication part 140 performs fax transmission of this transmission target data as the raster data via the public line to the fax number as the transmission destination information transmitted from the information processor 2 together with this transmission target data (S63).

Further, after the fax transmission of this transmission target data, the communication part 104 acquires a result of the present fax transmission from the facsimile communication part 140 (S64), and transmits this transmission result to the information processor 2 via the network interface 160 (S65). The information processor 2 transmits this transmission result towards the communication terminal device 3 via the server 5 in the mail format by the mailer function. As a result, in the communication terminal device 3 that has received this transmission result, a transmission history of each fax transmission is accumulated in the memory 314 by using this transmission result, and this transmission history is stored together with the transmission target data used for this transmission, thereby making it easy to retrieve and set a cover sheet and a document as transmission target data used in the past.

In case of a typical compound machine, to transmit transmission target data to a communication destination through fax transmission, it is required to operate an operation part of the compound machine by an operator or indirectly operate the compound machine from a personal computer connected to the compound machine through a LAN to perform fax transmission of the transmission target data. Moreover, use of a server that provides fax transmission service makes it possible to, by using a communication terminal device outside by the operator, perform fax transmission of transmission target data created or specified in this communication terminal device directly from the server to the transmission destination. In this case, some fee is required for using the present fax transmission service.

The communication terminal device, the information processor, and the facsimile device according to one aspect of this disclosure makes it possible to perform fax transmission while suppressing costs required for the fax transmission as much as possible, because the fee is not required even when the operator is located in a place where no facsimile device is installed, improving convenience of fax communication using the facsimile device.

This disclosure is not limited to the configuration in the aforementioned embodiment, and various modifications can be made thereto. For example, in the aforementioned embodiment, the information processor 2 and the image forming apparatus 1 are configured by different devices, but this image forming apparatus 1 may include the configuration of the information processor 2 as one example of the facsimile device. For example, the image forming apparatus 1 as one example of the facsimile device may include configuration of the data acquisition part 202 and the conversion part 203 of the information processor 2.

Moreover, the data transmission program, the fax transmission control program, and the fax transmission program described in the aforementioned embodiment may be recorded on a computer-readable, non-transitory recording medium, for example, a hard disc, a CD-ROM, a DVD-ROM, or a semiconductor device.

The configuration and the processing shown by using FIGS. 1 through 20 in the aforementioned embodiment are just one embodiment of this disclosure, and the configuration and the processing of this disclosure are not limited thereto.

Various modifications and alterations of this disclosure will be apparent to those skilled in the art without departing from the scope and spirit of this disclosure, and it should be understood that this disclosure is not limited to the illustrative embodiments set forth herein.

What is claimed is:

1. A communication terminal device comprising:
a transmission target setting part setting, based on an instruction from an operator, specification of transmission target data targeted for fax transmission performed by a predefined facsimile device;
a transmission destination reception part receiving, from the operator, input of transmission destination information indicating a destination for which the predefined facsimile device transmits by fax the transmission target data whose specification is received by the transmission target setting part;
a transmission part transmitting the transmission target data and the transmission destination information, together with a specific address indicating the predefined facsimile device, to a server so that the transmission target data and the transmission destination information are acquired by an information processor external to the server configured to access the server every predefined period to acquire, from the server, data accompanied by the specific address indicating the predefined facsimile device and transfer, to the predefined facsimile device, the acquired data as the transmission target data targeted for fax transmission performed by the predefined facsimile device;
a display part;
an input part receiving an operation from the operator; and
a control part allowing the display part to concurrently display information related to a document and a cover sheet which are elements of the transmission target data, information related to an operation status of the predefined facsimile device, information related to the transmission destination information, and a transmit button for receiving an instruction for executing transmission on a single screen before the transmission of the transmission target data and the transmission destination information to the server by the transmission part,
wherein when the input part receives an operation for selecting the transmit button, the transmission part performs transmission processing for transmitting the transmission target data and the transmission destination information to the server.

2. The communication terminal device according to claim 1, further comprising:
a result reception part receiving, from the predefined facsimile device via the server, a fax transmission result for the transmission target data transmitted from the communication terminal device to the facsimile device; and
a storage part storing, as a transmission history, the fax transmission result received by the result reception part.

3. The communication terminal device according to claim 2,
wherein the control part stores, in the storage part, the transmission result as the transmission history in correspondence with either of the transmission target data and the transmission destination information targeted for fax transmission indicated by the transmission result,
a transmission history reception part receiving, from the operator, specification of any of transmission histories stored in the storage part is further provided, and
the control part reads, from the storage part, either of the transmission target data and the transmission destination information in correspondence with the transmission history whose specification has been received by the transmission history reception part, and displays, at the display part, either of the transmission target data and the transmission destination information as a candidate targeted for next transmission.

4. The communication terminal device according to claim 1,
wherein the control part, upon the reception of the fax transmission result by the result reception part, displays, at the display part, next processing being executable by the communication terminal device, together with the reception result.

5. A facsimile device comprising:
a network interface configured to communicate with an information processor via a LAN;
an information reception part receiving from an Internet-connected communication terminal device via a server and the information processor, transmission target data and transmission destination information, together with a specific address indicating the facsimile device, from the server via the information processor, external to the server, wherein the information processor is configured to access the server every predefined period to acquire, from the server, data accompanied by the specific address indicating the facsimile device and transfer, to the facsimile device, the acquired data as the transmission target data targeted for fax transmission performed by the facsimile device;
a data conversion part converting the transmission target data received by the information reception part into data in a data format permitting fax transmission; and
a facsimile communication part performing fax transmission of the transmission target data, subjected to the conversion by the conversion part, to a transmission destination indicated by the transmission destination information received by the information reception part,
the communication terminal device comprising
a display part;
an input part receiving an operation from the operator; and
a control part allowing the display part to concurrently display information related to a document and a cover sheet which are elements of the transmission target data, information related to an operation status of the facsimile device, information related to the transmission destination information, and a transmit button for receiving an instruction for executing transmission on a single screen before transmission of the transmission target data and the transmission destination information to the server by the communication terminal device, wherein when the input part receives an operation for selecting the transmit button, the communication terminal device performs transmission processing for transmitting the transmission target data and the transmission destination information to the server.

6. The facsimile device according to claim 5, further comprising a communication part, after fax transmission of the transmission target data by the facsimile communication part, transmitting, to the information processor, a fax transmission result indicating a result of the fax transmission.

* * * * *